(12) United States Patent
Stubbers et al.

(10) Patent No.: US 9,008,256 B2
(45) Date of Patent: Apr. 14, 2015

(54) METHOD AND SYSTEM FOR IN SITU DEPOSITON AND REGENERATION OF HIGH EFFICIENCY TARGET MATERIALS FOR LONG LIFE NUCLEAR REACTION DEVICES

(75) Inventors: Robert Andrew Stubbers, Champaign, IL (US); Brian Edward Jurczyk, Champaign, IL (US); Darren Adam Alman, Savoy, IL (US); Matthew David Coventry, Champaign, IL (US); Michael Jerome Schaus, Glen Ellyn, IL (US)

(73) Assignee: Starfire Industries, LLC, Champaign, IL (US)

( * ) Notice: Subject to any disclaimer, the term of this patent is extended or adjusted under 35 U.S.C. 154(b) by 1028 days.

(21) Appl. No.: 12/919,890

(22) PCT Filed: Feb. 27, 2009

(86) PCT No.: PCT/US2009/035595
§ 371 (c)(1),
(2), (4) Date: Dec. 8, 2010

(87) PCT Pub. No.: WO2009/108906
PCT Pub. Date: Sep. 3, 2009

(65) Prior Publication Data
US 2011/0091000 A1     Apr. 21, 2011

Related U.S. Application Data

(60) Provisional application No. 61/031,921, filed on Feb. 27, 2008, provisional application No. 61/031,916, filed on Feb. 27, 2008, provisional application No. 61/031,912, filed on Feb. 27, 2008, provisional application No. 61/031,908, filed on Feb. 27, 2008, provisional application No. 61/031,899, filed on Feb. 27, 2008.

(51) Int. Cl.
*H05H 3/06*     (2006.01)
*G21B 1/19*     (2006.01)
(Continued)

(52) U.S. Cl.
CPC .. *G21B 1/19* (2013.01); *H05H 3/06* (2013.01); *H05H 6/00* (2013.01); *G21G 4/02* (2013.01)

(58) Field of Classification Search
USPC .......................................... 376/108, 109, 151
See application file for complete search history.

(56) References Cited

U.S. PATENT DOCUMENTS 2,943,239 A * 6/1960 Goodman ...................... 376/109
2,951,945 A * 9/1960 Goodman ...................... 376/109

(Continued)

OTHER PUBLICATIONS

Teller et al, Completely Automated Nuclear Reactors for Long-Term Operation II: Toward a Concept-Level Point-Design of a High-Temperature, Gas-Cooled Central Power Station System, Jun. 20, 1996, Lawrence Livermore National Laboratory, pp. 34-35.*

(Continued)

*Primary Examiner* — Jack W Keith
*Assistant Examiner* — Marshall O'Connor
(74) *Attorney, Agent, or Firm* — Leydig, Voit & Mayer, Ltd.

(57) ABSTRACT

Aspects of the invention relate to several methods to deposit and regenerate target materials in neutron generators and similar nuclear reaction devices. In situ deposition and regeneration of a target material reduces tube degradation of the nuclear reaction device and covers impurities on the surface of the target material at the target location. Further aspects of the invention include a method of designing a target to generate neutrons at a high efficiency rate and at a selected neutron energy from a neutron energy spectrum.

21 Claims, 23 Drawing Sheets

(51) Int. Cl.
H05H 6/00 (2006.01)
G21G 4/02 (2006.01)

(56) References Cited

U.S. PATENT DOCUMENTS

| | | | |
|---|---|---|---|
| 3,344,299 A * | 9/1967 | Bounden | 376/116 |
| 3,393,316 A | 7/1968 | Carr | |
| 3,417,245 A * | 12/1968 | Schmidt | 376/109 |
| 3,571,734 A | 3/1971 | Consoli et al. | |
| 3,664,960 A | 5/1972 | Wood | |
| 3,779,864 A | 12/1973 | Kaw et al. | |
| 3,794,875 A | 2/1974 | Stark | |
| 4,309,249 A | 1/1982 | Steinberg et al. | |
| 4,935,194 A * | 6/1990 | Verschoore | 376/108 |
| 5,103,134 A * | 4/1992 | Cluzeau et al. | 313/545 |
| 5,293,410 A | 3/1994 | Chen et al. | |
| 5,970,108 A * | 10/1999 | Drexler | 376/195 |
| 7,200,198 B2 | 4/2007 | Wieland et al. | |
| 2002/0150193 A1 | 10/2002 | Leung et al. | |
| 2003/0006708 A1 | 1/2003 | Leung et al. | |
| 2003/0152186 A1 | 8/2003 | Jurczyk et al. | |
| 2003/0234355 A1 | 12/2003 | Leung et al. | |

OTHER PUBLICATIONS

Teller et al, Completely Automated Nuclear Reactors for Long-Term Operation I1: Toward a Concept-Level Point-Design of a High-Temperature, Gas-Cooled Central Power Station System, Jun. 20, 1996, Lawrence Livermore National Laboratory, pp. 34-35.*
Extended Search Report from co-pending European Application No. 09713677.4 dated May 12, 2013 (7 pages).
Extended Search Report from co-pending European Application No. 09758811.5 dated Jun. 12, 2013 (8 pages).

* cited by examiner

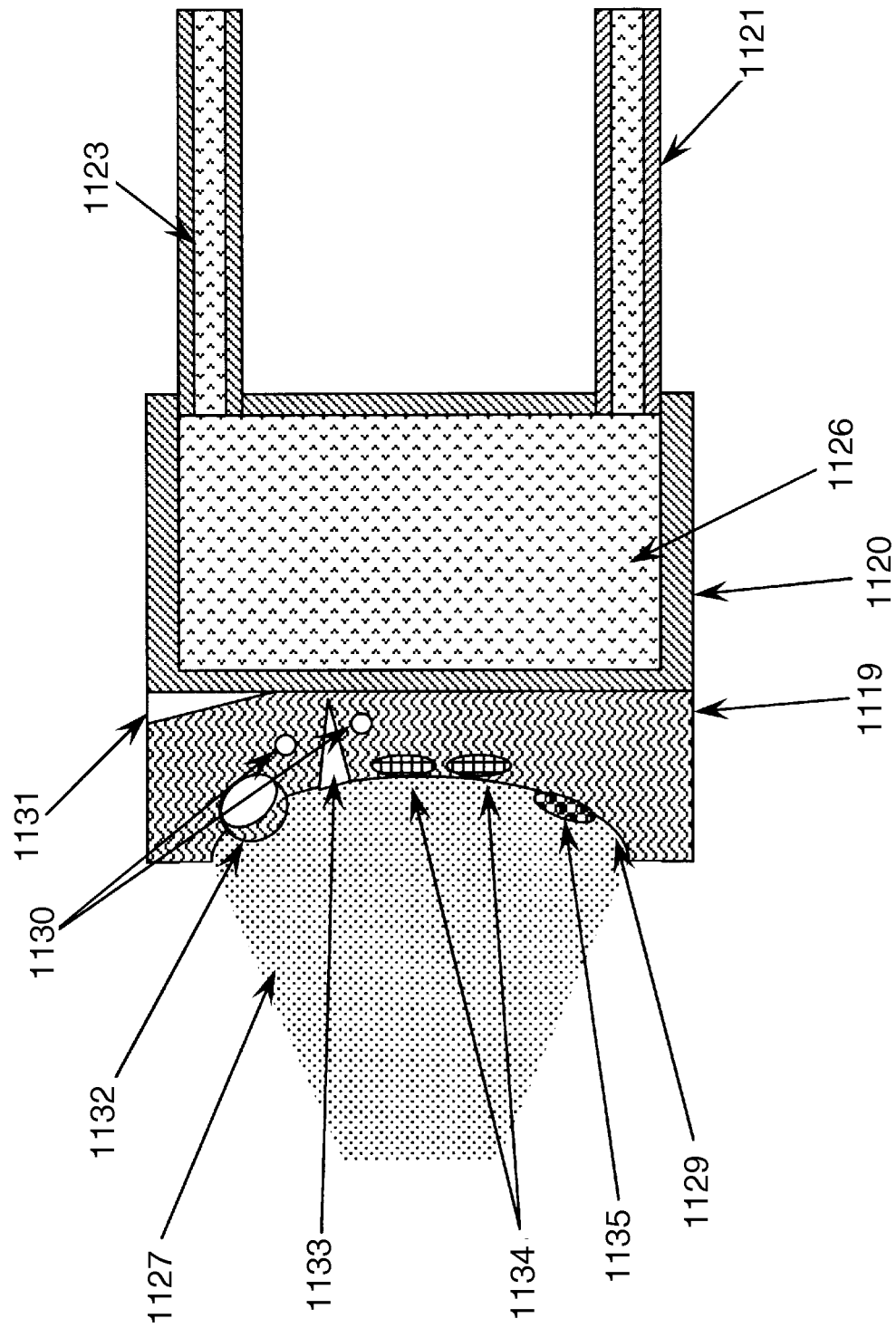

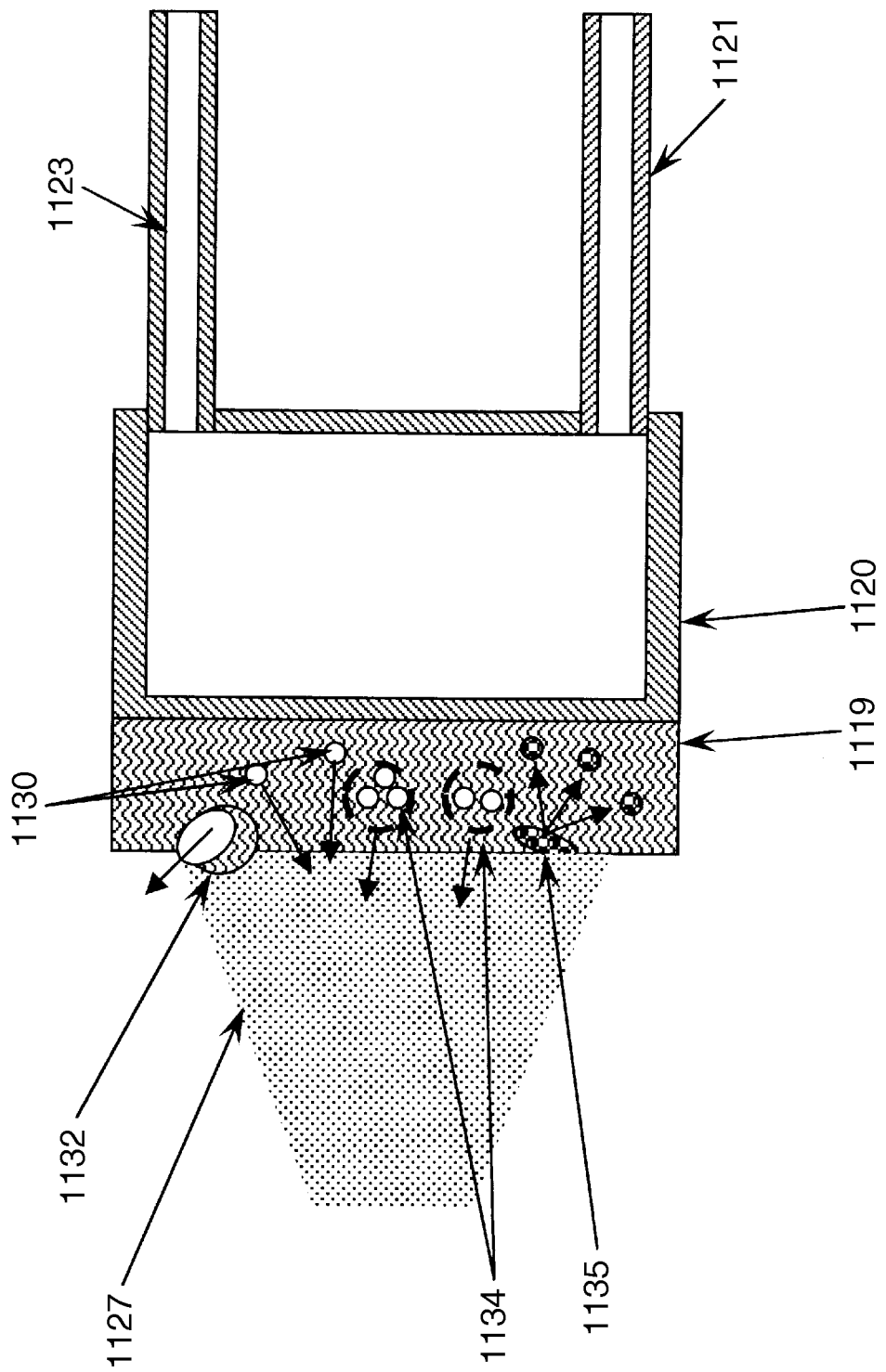

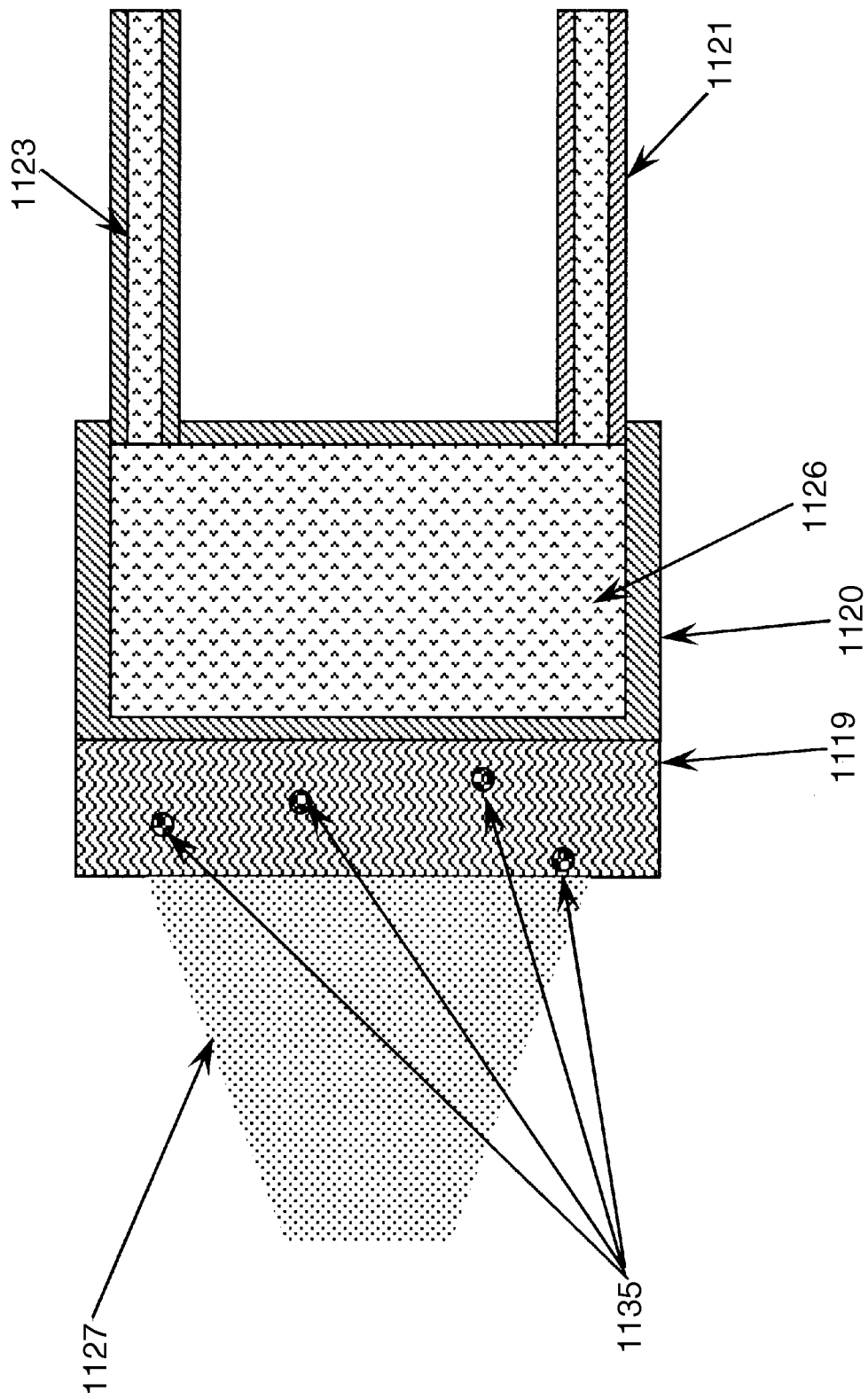

A preferred Embodiment

Comparison of neutron energy distributions

METHOD AND SYSTEM FOR IN SITU DEPOSITON AND REGENERATION OF HIGH EFFICIENCY TARGET MATERIALS FOR LONG LIFE NUCLEAR REACTION DEVICES

CROSS-REFERENCE TO RELATED APPLICATIONS

This patent application claims the benefit of U.S. Provisional Patent Application No. 61/031,899, filed Feb. 27, 2008, 61/031,908, filed Feb. 27, 2008, 61/031,912, filed Feb. 27, 2008, 61/031,916 filed Feb. 27, 2008, and 61/031,921, filed Feb. 27, 2008, all of which are incorporated by reference into this patent application in their entirety.

BACKGROUND OF THE INVENTION

Neutron-based interrogation techniques offer unique capabilities for inspection and verification for the control of special nuclear materials, explosives detection via elemental composition analysis, and radiographic imaging through shielded containers, which are relevant to homeland security. Neutron-based elemental analysis allows industrial process control in the cement and coal industries for real-time on-line elemental analysis. However, generating sufficient neutrons for such analyses is difficult. Radioactive neutron sources are currently used in industry in a variety of places, including on-line elemental analysis of mining, coal, and cement feedstocks, sub-surface scanning (e.g., soil composition analysis and landmine detection), and radiography. The traditional neutron source has been a radioisotope such as $^{252}$Cf or Am—Be. Radioisotopes are always on, require shielding, limit types of analysis (e.g., no pulsing or time-of-flight), and pose a personnel hazard during manufacturing and assembly, as well as a security hazard due to threats of so-called "dirty bombs." Neutrons can also be generated with conventional accelerator technology but these systems have large size and power consumption requirements. Having a compact and efficient neutron generator would directly benefit many industries by solving the problems associated with radioactive isotopes while avoiding the complications of large accelerators.

Accelerator-based neutron generators use an electric field to accelerate a beam of ions into a target. Ions from the beam react with atoms in the target, and undergo nuclear reactions (including, but not limited to, nuclear fusion). With the proper choice of ion and target species, these nuclear reactions provide a source of neutrons. The ions are often, but are not limited to, an isotope of hydrogen (H)—either protium (p or $^1$H), deuterium (D or $^2$H), or tritium (T or $^3$H), for several reasons, including their tendency to remain in the target at least briefly before returning to gas phase. For simplicity, hydrogen may be used to refer to any of these isotopes. The fuel species can be a combination of any compounds, atoms, isotopes, nuclei, or subatomic particles that react in such a way that neutrons are released either as a direct product of the reaction, through further decay of the reaction products, or by any other means.

The basic layout of a modern compact accelerator neutron source is shown in FIG. 1. The standard hardware consists of: (1) A high-voltage generator (~100 kV is a common accelerating voltage) 105; (2) A target that is composed of or contains one or more of the reactants in the neutron producing nuclear reaction (e.g., titanium containing D or T) 110; (3) One or more accelerator grids; (4) An ion source assembly 115; (5) A gas-control reservoir that often uses a getter 120. Additional hardware may include a gas pressure control 125 connected to the gas reservoir 120, a magnet 130, a source anode 135, and a source cathode 140. An exemplary neutron source may also have a high-voltage insulator 145 and accelerator lens 150.

Operation of typical neutron generators proceeds as follows. Either pure deuterium (D-D system), pure tritium (T-T system), or a deuterium-tritium (D-T system) mix of gas (up to 10 Ci of T) is introduced into the system at pressures around 10 mTorr. A plasma is generated to provide ions that are extracted out of the source region and accelerated to ~100 keV. These ions bombard the target where they can undergo fusion reactions with other hydrogen isotopes embedded in the target. DD fusion reactions generate 2.45 MeV neutrons, TT reactions generate a continuous spectrum of neutrons above 9 MeV, and the DT reaction makes 14 MeV neutrons. The systems can be operated continuously or in pulsed operation for time-of-flight measurements.

A typical neutron generator will often have an extra electrode nearest to the target that is biased negatively with respect to the target. The function of this "electron suppression electrode" is to repel negatively charged electrons that are ejected from the target during ion bombardment. This reduces the amount of current that the power supplies must drive, therefore increasing the efficiency of the generator.

The key attribute for these systems is their compact size. Modern compact accelerator-based neutron generators are typically less than 6 inches in diameter and suitable for insertion into oil well boreholes, cross-belt analysis systems, and portable explosives detection systems. There are several major suppliers of non-radioactive neutron generators, all using this type of accelerator-target configuration. List prices range between $85,000-$350,000 with the highest cost components being the high-voltage power supply, electrical feeds, and interconnects. Lifetime is limited by the degradation of the target material and the coating of insulators with best suppliers reporting ~1000 hours for nominal output levels of $1 \times 10^6$ DD n/s and $1 \times 10^8$ DT n/s, and replacement target units range from $5-50K each. Currently, no suppliers have cost-effective high output ($>1 \times 10^8$ n/s) DD systems, thus forcing end-users to adopt more expensive and larger footprint linear accelerator and radiofrequency quadrupole-based systems to achieve high outputs needed for inspection and analysis.

Degradation of Target

Traditional targets are fabricated external to the vacuum chamber, and under beam bombardment suffer degradation and erosion limiting lifetimes to hundreds to thousands of hours under moderate beam current conditions. Other traditional targets, as in U.S. Pat. No. 6,922,445, a fusion neutron source is chosen with deuterium and tritium isotopes of hydrogen for the reacting species with a long gaseous target volume to stop ions with maximum chance for nuclear-producing collision. However, the pressures needed for small device size make traditional vacuum electronics difficult. Solid-style targets achieve a high density of fusion targets by sacrificing energy efficiency and lower reaction probability for compactness.

Under bombardment of energetic ions, the target will gradually lose material through sputtering. Over enough time the whole target thickness can be eroded away. This cannot be avoided simply by making the target arbitrarily thick for reasons including, but not limited to, because a thick target makes it difficult to remove enough heat from the target, or requires a larger amount of fuel to be loaded into the target (e.g., can be a tritium inventory issue). A thin target with good thermal contact to a good heat conducting material (e.g., copper) backing is preferred for thermal management. Sputtering through to the backing material could cause the generator to fail due to no fuel being left for which the beam to react with, or erosion of the backing onto insulator surfaces, while thicker targets may have to be run hotter, and can have lower equilibrium concentrations of hydrogen and therefore a lower efficiency (neutrons/seconds per Watt of input energy). In the case of a D-T system, having to fill a large target with tritium can present a regulatory problem if the required amount of radioactive tritium is above the applicable legal limit.

Additionally, there can be problems with gas buildup inside the target as hydrogen is implanted by the ion beam. Embrittlement, leading to blistering and cracking/flaking of the target can limit the lifetime of the target.

Another effect that can limit the lifetime of the target is the buildup of impurities in or on the target surface. These impurities can be, but are not limited to, debris from elsewhere in the generator, debris that was present in the environment during fabrication of the generator, or compounds that are formed on the surface through chemical reactions with the background gas. Impurities dilute the fuel concentration in the target, increase the amount of energy lost to non-neutron producing scattering collisions of the ion beam with the target, disrupt the structure of the target material, or otherwise degrade neutron output or efficiency.

In addition to various failure mechanisms that require repair or replacement of the generator, traditional neutron generators suffer output degradation over time as the target degrades. This requires an initial over-sizing of the generator in the beginning to account for this loss in output over time.

BRIEF SUMMARY OF THE INVENTION

Aspects of the invention described herein can be applied to a wide range of device that include, but are not limited to, neutron generators, sealed neutron generators, charged and/or neutral particle accelerators, specific nuclide generators, positron emission tomography, PET nuclide generators, and radiation sources.

In Situ Deposition

Aspects of the invention include methods and systems for fabricating and maintaining long lifetime targets for neutron generators. Further aspects of the invention may include an exemplary method of performing in-situ deposition of target material within the neutron source, either at initial fabrication, at discrete intervals during operation, or continuously during operation, to establish the target, replenish or reduce degradation of the target, and/or maintain the purity of the target. Such a technique would minimize the number of tube replacements and lower the total cost of ownership. In addition, it would minimize neutron output performance degradation over time and improve output reliability.

Additional aspects of the invention that relate to in situ target material deposition address some of the lifetime-limiting problems with existing neutron generators. In situ deposition processes can nullify any lifetime or degradation effects associated with sputtering or other removal of target material during operation. It can be used to replenish the surface after some amount of operation or after the target thickness reaches some minimum thickness, or it can be used constantly during operation to lower or eliminate the net target erosion rate. Typical thickness of a target may be between 2 μm to 2000 μm.

The ability to add target material in situ allows the initial target thickness to be kept to a minimum. This allows for good thermal contact between the target material and any heat removal mechanism or backing material that may be present. Good thermal contact provides more control over the target temperature during operation so, for example, the target could be kept cooler to maintain a higher equilibrium concentration of the desired fuel atoms in the target.

A thinner target during operation also means that there are a lower total number of fuel atoms in the target than there would be in a thicker target for the same loading level, or number fraction of fuel atoms. A lower total number, or inventory, of fuel atoms can be an important consideration when using a radioactive (or otherwise regulated or limited substance) fuel species in the target.

Moreover, in situ deposition of the target material can negate the deleterious effects of impurity buildup in or on the target. If the target surface becomes degraded due to the presence of impurities as discussed above, in situ deposition can be used to deposit fresh target material on top of the existing impure surface. Incident ions can now interact fully in the pure surface, and any deeper-lying impurities in the target are avoided.

In some cases, impurities may be eroded from the target surface along with the target material. Combining this effect with constant deposition of target material during operation of the generator maintains a high level of purity of the target surface, i.e., impurities and target material are eroded, while only fresh target material is deposited. The deposition rate can be matched to the natural removal rate of target material, setting up a condition where there is zero net erosion of the target. The target thickness and purity stay constant over the lifetime of the device.

Another advantage of extending the lifetime of the target through in situ deposition of target material is that it extends the lifetime of the neutron generator, requiring less frequent tube replacement or other maintenance that requires opening of the sealed tube, and overall decreases the cost of ownership of the neutron generator.

Target material may be deposited on the target substrate, or a target location, in a plurality of ways. It can be evaporated or otherwise deposited from the vapor phase, sputtered, deposited by a beam, or can flow in as a liquid from an external source. Evaporative deposition would involve heating a reservoir (target source) of target material above the temperature where the material evaporates or sublimates, so that target material leaves the reservoir and condenses on the relatively cold target surface at a target location.

A similar process called chemical vapor deposition (CVD) could be used, in which volatile growth precursors in the vapor phase react chemically with or decompose on the target surface, growing target material as a result. Sputtering would involve bombarding a reservoir (target source) of target material with energetic ions or atoms, knocking them out of the reservoir and toward the target material at the target location. Sputtering could occur either as a side-effect of normal operation of the neutron generator, or by initiating a separate discharge or ion beam during a maintenance cycle. If the target material is easily meltable, a separate reservoir (target source) of the target material can be stored in the neutron generator, liquefied at the desired time, and coated onto the target surface in the liquid phase.

The source of target material for any of these deposition processes can be, but limited to, coatings on one or more surfaces of parts of the nuclear reaction device, materials of one or more surfaces of parts of the nuclear reaction device, electrodes of the nuclear reaction device, a reservoir, an evaporator assembly, or elsewhere. The target source location maybe displaced from the target location, but may also be physically connected to or continuous with a body of target material at the target location. The source could also be any surface that has collected material that was previously eroded from the target itself. Additionally, in the case of discrete depositions, the reservoir could contain multiple charges so that the operation can be performed multiple times over the life of the generator. An optimal position for the evaporation or sputtering source would be one which has a clear line of sight to the target, so that a maximum amount of evaporated or sputtered material lands on the target surface, and not on other surfaces in the device (e.g., insulators).

The deposition of target material can be performed at different times, and for different purposes. In situ deposition can be performed during initial manufacture of the neutron generator tube to form a pristine target surface. To repair erosion and degradation of the target after some operation, in situ deposition can be performed either at discrete times (e.g., maintenance cycles), or can be used continually during operation to deposit fresh material to the surface as existing material is removed and/or damaged.

To improve adhesion and thermal contact to the existing target surface, the target can be heated or cooled to the optimal temperature just prior to deposition. Likewise, the target surface can be cleaned just prior to deposition through the use of a discharge, heating, or other cleaning technique.

In situ deposition can be applied to neutron generator systems employing many different target materials, including materials used in existing neutron tube sources. Desirable target materials can be any material that can undergo, or can hold a significant quantity of another species that can undergo, a neutron-producing nuclear reaction with a species contained in the ion beam. In terms of in situ deposition, some materials work better in different embodiments. In the case of sputter deposition, light elements work well because they are sputtered more easily by hydrogen due to their similarity in mass. The target material preferably has a threshold energy for physical sputtering below the kinetic energy of the ions that does the sputtering. The target material may have a significant sputtering yield due to bombardment by ions of hydrogen, or whatever other fuel is being used, at the desired energy. For evaporation, the target material may evaporate at temperatures that can be reached in the system, e.g., if the material is evaporating from an electrode surface. For CVD, the target material is preferably capable of being grown from volatile precursors that react at the target surface. In order to regrow the target by flowing material from a liquefied reservoir to the target, the target material may be melted near the target, and transported to the target in liquid form. In the latter case, processes that take advantage of surface tension, wicking and capillary action to regrow the target, such as flow through a porous substrate, are possible.

In Situ Regeneration

Other aspects of the invention relate to a method for regenerating target material in beam-target particle generators used for generating neutrons via fusion and/or other neutron-producing reactions, and for generating other useful nuclear-reaction products, such as gamma rays, protons and/or isotopes as a result of beam-target interaction. These aspects of the invention may include neutron generators, however, persons skilled in the art would recognize that neutron generators do not limit the scope of the invention. Since hydrogen isotopes—hydrogen, deuterium and tritium—are used extensively in these devices, the terms hydrogen, deuterium and tritium are often used interchangeably to describe any of these individual elements or combinations of them. For example, the phrase "a beam of deuterium ions" is meant to include hydrogen, deuterium and/or tritium ions, unless a certain process, such as the radioactive decay of tritium, is only relevant to one of this set. The terms "hydride" and "deuteride" should also be understood to be inclusive of all relevant hydrogen isotopes that may be present. In addition to fusion, other reactions, which may not be considered by all to constitute a fusion reaction, but rather may, for example, be considered as a fission reaction, such as several neutron producing reactions of beryllium, are also intended when the term fusion is used.

Targets are fabricated to be thin to minimize the amount of thermal barrier to keep the material cool. However, the target should also be thick enough to stop impinging ions within the target layer and provide some margin for erosion of the target layer. Targets are often layered with copper, or other high thermal-conductivity material, for heat removal, material layers for grafting (bond compatibility), and/or material layers for creating diffusion barriers. The problem with thin films is residual stress and built up stresses over time due to gas loading in the target that can lead to delamination, flaking, cracking, blistering, and other harmful effects. Materials such as titanium exhibit different stages of hydriding that change the material properties and can lead to crumbling of the material. Thus, the usable life of a beam-target generator is often limited by the usable life of the target material. Aspects of the disclosed invention provide a method for regenerating such targets, which, in turn, extends the life of the generator.

Regeneration applies to many target and beam geometries, such as substantially planar targets, cylindrical targets, conical targets, and spherical targets. Target materials that can be regenerated consist of the set of materials—elements, alloys, compounds, composites or mixtures—that can be sputtered, evaporated, sublimated, or melted. Examples of such materials include, but are not limited to, lithium, beryllium, boron, carbon, and titanium.

Thermal limits usually force using a very thin target that is ~10 μm-100 μm thick to keep the temperature low for high deuterium inventory (diffusion) in the case of fusion neutron generators, however, some materials that have high thermal conductivities, such as lithium, or high temperature limits, can be thicker.

Regeneration can redistribute, anneal (reduce stress) and degas a target material, while removing/dispersing surface contaminants, allowing greatly extended target lifetime by effectively restoring a target to a state that better approximates a new target. Regeneration can be carried out on a continuous basis, or it can be carried out at discrete intervals.

Additional aspects of the invention may relate to long lifetime targets for accelerator-based nuclear-reaction product generators, especially fusion neutron generators. The disclosure describes exemplary methods to regenerate a target in-situ within the vacuum envelope of a device to refresh the beam interaction layer and the target material layer. This process can be performed continuously or at discrete intervals to repair damage to the target and anneal the material to remove stresses, bulk diffuse contaminants, etc. Such an exemplary in-situ technique can improve reliability and extend the lifetime of targets to minimize the number of tube replacements. Target degradation in the current state of the art lowers device performance and can severely limit lifetime. If the target surface blisters and cracks, throwing particles of target material into the acceleration region or a location of high electric field, then there is the chance for catastrophic failure of the device, severe damage or need for re-conditioning of the device at high voltage. This can result in down time, lost hours of operation and costly replacement.

The target material can be heated to anneal the material. This can be done with an in-situ heater, by induction, by direct beam impingement, or other heating processes. Coolant to the target can be turned off or throttled such that the material may heat up. The target can even be melted to distribute materials evenly across the beam interaction layer. A heating process can be used in an exemplary regeneration method, in some cases allowing material melting, to release trapped gasses, such as deuterium, tritium and helium, from the material to prevent or remove blister pockets of gas and buildup along grain boundaries that promote internal stresses. Tritium can be released back into an internal gas reservoir to minimize the total amount of inventory needed in the system (buildup). The regeneration process can also improve thermal contact with the substrate since delamination can be countered and the surface re-wet.

The heating/cooling can be slow and steady to allow the material to equilibrate, or it can be rapid to promote diffusion and freezing of contaminants into the bulk of the material. Slow and controlled heating/cooling can be used to control the distribution of hydrogen rich material, effectively liquid-phase epitaxial growth of the hydrogen-rich material on the surface that comes from hydrogen implanted in the bulk. Controlled cooling can also be used to remove surface contaminants. In the molten state, surface contaminants, such as oxides, nitrides, silicon, and electrode material, for example, can dissolve into the bulk of the molten material, and if the material is rapidly cooled, these contaminants are trapped in the bulk, leaving a fresh and clean surface behind.

Lithium is one candidate for a target material in methods for in situ target deposition and regeneration due to its low melting point and ability to uptake hydrogen isotopes for fusion reactions and undergoes fusion reactions itself. These and other properties of lithium allow it to be a high efficiency target in neutron generators. Other alloys and materials are possible, and the regeneration process can be extended to these materials as well. The surface of a regenerated target is refreshed by removal of contaminants because the contaminants diffuse into the bulk or are released, and/or by redistribution of the target material. This improves the ion interaction layer region, thereby improving reaction rate efficiency.

Regeneration can be used in conjunction with other lifespan enhancing methods, such as in-situ deposition or injection techniques to provide new material, alloying materials or compounds to repair the target. Regeneration deals with damage repair and mitigation of target material, and it does not depend on type of particle accelerator. Direct current high-voltage accelerators are used to illustrate regeneration because they are simple.

The target material in beam-target neutron generators undergoes several degradation mechanisms that are partly responsible for neutron generator tube life limitations. Some degradation mechanisms include: erosion, contamination (metallic and nonmetallic), embrittlement, gas-buildup, swelling/shrinking, blistering, cracking, flaking, and delamination. Means of repairing and/or reforming target material in-situ (without disturbing the vacuum envelope), termed regeneration, can extend the usable life of such beam-target neutron generators. Thus, aspects of the invention that relate to target regeneration have broad applicability to all applications of neutron generators and generators of other nuclear-reaction products.

Several exemplary regeneration methods and systems are disclosed that can apply to a broad range of target materials for nuclear particle generation, especially neutron generation by fusion or other neutron-producing reactions, including, but not limited to, lithium, beryllium, boron, carbon and titanium. Although applications to neutron generators are discussed primarily, regeneration applies to other devices that use targets to generate nuclear reaction products, such as gamma-rays, isotopes, and protons. Regeneration also applies to many target, electrode, and particle beam configurations, including, but not limited to, a cylindrical target with radial particle beam flow, a planar (or disc) target with generally linear particle beam flow, or a spherical target with generally radial particle beam flow. The specific beam and target configuration is not critical to practicing aspects of the disclosed invention. The application of target regeneration to the various target materials may vary depending on the physical characteristics of the material. For example, a lithium target can exploit the liquid phase of lithium, whereas a carbon target, which sublimes rather than melts, may require a modified approach or may experience a different degree of regeneration. Some targets, such as titanium, can undergo either mode of regeneration. For this reason the disclosed regeneration technology is divided into two categories: type-1 regeneration, in which target materials are melted (undergo a solid to liquid transition), and type-2 regeneration, in which target materials are not melted or sublimate (undergo a transition from solid to vapor phase with a negligible or nonexistent liquid phase). Lithium is an example of a material that can undergo type-1 regeneration and carbon is an example of a material that can undergo type-2 regeneration. Titanium is an example of a material that can undergo either or both types of regeneration.

High Efficiency Target

Accelerator-target neutron sources achieve nuclear reactions through high-energy interaction of an ion beam with embedded deuterium or tritium in a target material. Traditionally, these systems employ titanium as a hydrogen-absorbing material for a high number of available target atoms for fusion. However, the relatively high atomic number for titanium leads to large electronic stopping power on the incident ions. This electronic drag decreases the incident ion energy rapidly before encountering sufficient targets for efficient fusion. Combined with low hydrogen isotope loading at the target, this leads to poor neutron production efficiency. Aspects of the invention relate to utilizing low effective atomic number targets to minimize the electronic stopping, maintain high effective ion energy during implantation into the target sub-surface, and improve fusion efficiency.

In one aspect of the invention, lithium is the target material taking advantage of its very low atomic number ($Z=3$), ready formation of chemical and trapping bonds with hydrogen isotopes, excellent thermal conductivity to maintain low target temperatures to maximize hydrogen trapping and minimize diffusion for high loading fractions, and secondary reactions with lithium which boost the overall neutron yield.

Further aspects of the invention relate to primarily designing a target material to: (1) have a low effective atomic number to minimize electronic stopping and energy loss ($dE/dx$) of the incident ion beam through the target; (2) maintain a high hydrogen isotope loading fraction under beam bombardment, taking into account dynamic beam loading, lattice breakup and local recombination; (3) have good thermal properties to minimize negative hydrogen diffusion and promote D or T trapping within the target; and (4) take advantage of secondary nuclear producing reactions to enhance the overall neutron production rate. High neutron production efficiency per unit input power depend on the optimization of these factors for a given material composition, target shape (ion beam current density) and temperature (both average and surface interaction layer).

Traditional neutron generator targets have been selected for hydrogen-adsorption properties, such as titanium. In relation to (1) above, the influence of the target material on the overall fusion reaction rate is very strong, especially with high atomic number targets. When charged particles, such as a deuterium ion, slow down in a material, the rate at which they slow down depends in a roughly linear fashion with the atomic number of the material they are in. Titanium has an atomic number of 22 compared to 1 for deuterium. Hydrogen-rich uranium has an atomic number of 92, so the slowing down effect can be pronounced.

Using cross sections for only DD fusion and ion slowing-down relations, the neutron production efficiency for $TiD_2$, LiD and $D_2$-gas targets have been calculated as a function of incident ion energy. FIG. 13 shows the neutron production efficiencies (neutrons/second/Watt) resulting from this calculation, along with data at the operating points of two commercially available neutron generators. As expected, the yield for LiD is about half that of pure $D_2$ gas, and the yield of $TiD_2$ is approximately ¼th that of pure $D_2$ gas (⅛th yield due to $Z_{effective}$, but times 2 deuterium atoms per titanium). Note that the data is per Watt, hence, a 100-keV beam is for a current of 10 µA, and a 1-MeV beam is for a current of 1 µA. Also shown are the neutron production efficiencies for several commercially available neutron generators calculated based on data from product literature for yield and beam power. Each is substantially below its theoretical curve (~1/10th).

Not only is selection of a target material important to lower the effective atomic number, the resulting loading fraction for that material adjusts the relative weightings and target interaction probability such that the combination of the two conditions is important for maximizing target neutron production efficiency. It is also important to note that the presence of surface impurities affects the neutron production efficiency, since the ion beam interaction layer is a function of the incident energy and is typically less than 10 µm.

Aspects of the invention include a particle source (e.g., ion source) that generate particles. These particles may include, are not limited to, atomic and molecular ions of hydrogen isotopes, including mixtures of isotopes $H^+$, $D^+$ only, $T^+$ only, and a mixture of $D^+$ and $T^+$. Additional aspects of the invention apply to many target material combinations, including without limitation H, Li, Be, B, C, Ni, Na, Cu, Al, Sc, Ti, Fe, Cr, Mo, Ta, La, Sr, Y, Zr, U, Th, W, 300-series and 400-series stainless steels, and any combination, compounds, alloys, mixtures, and isotopic abundances thereof. Target compounds containing multiple materials with good hydrogen storage properties are good candidates to increase the number of D and T atoms present in the beam interaction layer while lowering the effective Z. Lithium borohydride may be a choice with a formula $LiBD_4$, with a $Z_{effective}$ of 2, or lithium alanate with a stoichiometric formula of $LiAlD_4$ and $Z_{effective}$ of 3.3.

Another aspect of the invention (i.e., (2) above) relates to maintaining a high hydrogen isotope loading fraction under beam bombardment, taking into account dynamic beam loading, lattice breakup and local recombination. Since the relative weighting of the atomic species in the target interaction layer determine the effective stopping power, the ability to retain hydrogen is very important.

An impinging ion into the target at 100 keV (impinging particles on a target may have an energy between (20 keV and 500 keV) decelerates through electronic stopping where a majority of ion energy is transferred to electrons in the lattice through ionization events during the high-energy deceleration phase, and lattice recoils and displacement events during the low-energy deceleration phase. Over a 100 keV deuterium ion trek length, several thousand bonds can be broken with multiple lattice displacements. These broken bonds can result in liberated D or T atoms that naturally form a molecular bond with another free atomic hydrogen atom. Once a molecular species is formed, it is very difficult to separate and the gas may become trapped in the target material (if in a void or displacement region) or quickly migrate out of the target along cracks and grain boundaries. The influence of the impinging ion beam may break bonds and potentially liberate many more hydrogen atoms per unit ion implanted. Thus, it is important to minimize the loss of trapped hydrogen from the target under beam breakup conditions.

Under high beam current densities, multiple ionization events can occur locally within several lattice constants (spacing) forming multiple atomic hydrogen atoms. Based on the lattice temperature, presence of free target atoms (such as titanium or lithium) for recapture into hydride or compound formation, the presence of free hydrogen atoms (from ionization), and the hydrogen atom lattice jump probability, there is a chance to form molecular gas and leave the target. The rate balance process can be adjusted by tailoring the beam current density such that atomic hydrogen formation rate is less than the recombination or recapture rate within the lattice. Target shape and ion beam profile can affect these rates.

In addition, the hydrogen concentration can be modified by adjusting the diffusion process (i.e., (3) above) by controlling temperature, in both the interaction zone and bulk target itself, and choosing target materials with select chemistries, electron affinities and bonding potentials to enhance trapping potential. Hydrogen undergoes diffusive transport through a lattice by jumping from site to site, until it reaches a grain boundary or other free surface. The time constants for diffusion depend on the free energy in the lattice (temperature) and the trapping potentials (material and lattice properties). Since diffusion is a statistical transport process and governed by thermodynamics, minor changes in target temperature can have a significant impact on the diffusion process since it is governed by the energetic tail of the thermal population. Similarly, the choice of target material or compound can influence the overall jump probability since the barrier height is adjusted.

Designing a target with good thermal conductivity and thermal transport from the ion beam interaction region can improve loading fraction. Cooling the target with a suitable coolant, thermoelectric system or even liquid nitrogen could provide enhanced hydrogen isotope retention and increased efficiency.

The overall design of a neutron generator target is influenced by trade-offs. A titanium target might be fabricated thin (<100 µm) onto a high-conductivity thermal substrate to keep temperature low. This increases target efficiency at the expense of lifetime, since a thin target is easily eroded or contaminated. Or a thick titanium target may be used for extremely long life, but at the expense of loading fraction and neutron output efficiency.

In addition, there are nuclear reactions between energetic deuterium and tritium ions for several low-Z elements that produce additional neutrons. Lithium isotopes, in particular, have favorable cross sections for neutron-producing reactions and thus the inclusion of lithium into the target material may produce additional neutrons without additional energy, leading to even greater efficiency. Neutron output can similarly be increased by using multiplying materials, including but not limited, to Be, Bi, Pb and U.

Selectable Neutron Energy Spectrum

Some of the subsequent nuclear reactions $D(d,n)^3He$, $D(t,n)^4He$, or $T(t,2n)^4He$ that produce energetic neutrons have comparatively large reaction cross sections at reasonable energies making their use favorable over other possible neutronic reactions. The first reaction listed (D-D) uses deuterium fuel which is stable (in the nuclear sense) and hence has no associated radiological hazard. The second two reactions, D-T and T-T, respectively, require the use of tritium, which does present a radiological hazard as it is a beta-particle emitter and is readily absorbed by the human body. The use of tritium, therefore, necessitates additional safeguards for public and personnel safety adding cost and additional regulatory concerns.

Another important comparison between the three reactions is the energy of the emitted neutron. In the D-D and D-T cases, neutrons are monoenergetic with 2.45 and 14.1 MeV, respectively and neglecting center-of-mass motion. The T-T reaction, however, produces neutrons with a continuous spectrum of energies (shown in FIG. 20) since there are three reaction products and thus a large number of combinations of energies that conserve energy and momentum. In a real D-T system, however, there will likely be side D-D and T-T reactions, although at a much slower rate that will add a small feature to the monoenergetic spectrum.

While D and/or T ions may start as the bombarding ions, they are imbedded in the target assembly and are then potential target nuclei. This makes the target basically a solid host to keep implanted D and/or T for later ions to bombard. This target assembly has been made from numerous materials over the decades of use including, but not limited to Ti, Zr, Sc, and C or others that do a good job of promoting retention of the implanted hydrogen as long as possible. Often the target is a thin layer of this material on top of a large thermal reservoir—the substrate—that is cooled (e.g., a copper cylinder residing partially in vacuum and partially in air) actively or passively.

Present-day neutron sources for many industrial applications are often large amounts of a particular radionuclide. The motivation for using radionuclides over the existing generation of compact accelerator neutron generators is a combination of cost and resulting neutron energies. While the costs of radionuclide-based systems remain less expensive, their expense is growing rapidly with the concerns of radionuclide material being diverted for use in dirty bombs and the like. Greater regulation and resulting higher costs are expected for these sources. These represent a completely different method of obtaining the neutron fluxes needed. A radionuclide-based neutron source is one that relies on natural radioactive decay of specific nuclides. The sources are lumps of material that either undergo spontaneous fission to release neutrons directly ($^{252}Cf$) or emit alphas that are deposited directly into $^9Be$ to emit neutrons (common examples are Am—Be or Pu—Be sources). These sources simply require the assembly of sufficient quantities of the radionuclide to produce the neutron source strength required. Due to reliance on radioactive decay, there is also a natural lifetime limit imposed by the fact that as the decays occur, the source strength decreases exponentially with time and must be replaced periodically. These sources of neutrons are always "on" and require corresponding regulatory constraints for public and personnel safety. Radionuclide sources, however, do provide a continuous spectrum of neutron energy, with a small fraction extending into the fast neutron region as shown in FIG. 19. As these sources have been used in industry for some time, some bulk materials analysis, security screening, and imaging techniques, in fact, rely on the different neutron energies for various interactions to occur. Some, for example, require copious thermal neutrons for most elemental identification with a small fraction above 6-8 MeV to identify some particular nuclides. To meet the needs of these types of analysis systems, either the radionuclide sources or compact accelerator sources using the T-T reaction (requiring the radionuclide tritium) are required. Using the D-T system, while providing sufficient neutrons and all at the higher energy require substantially more shielding and moderation (adding to cost), in addition to still requiring tritium.

Additional aspects of the invention include a method for customizing the output spectrum of neutrons from a neutron generator for various applications. By selecting the target materials' elemental and isotopic composition and selecting ion energy, the output emission spectrum can be adjusted across a range to suit particular applications. Lithium (or lithium-containing) is identified as an exceptionally promising candidate for this application as it is a condensed material at convenient temperatures (unlike hydrogen) which allows some decoupling of the target species from the ion species thus providing a mechanism to include or exclude reactions with it by either physical displacement or other suitable means during operation. With two (or more) target nuclides available in a given target assembly, variation of ion energy (per nucleus) can also vary the neutron energy spectrum during operation by taking advantage of the difference in cross sections (integrated cross sections in the case of the usual thick targets used). Further, by tailoring the isotopic levels of each element included, one can manipulate the neutron energy spectrum during manufacturing for specific application needs. An exemplary method outlines the means to create a neutron source with a partially-fast neutron energy spectrum (up to 13 MeV) without the use of radioactive tritium gas or a radionuclide-based neutron source.

BRIEF DESCRIPTION OF THE SEVERAL VIEWS OF THE DRAWINGS

FIG. 11(a) shows an exemplary damaged target with surface impurities, bulk hydride deposits, trapped gas, blistering, cracking, and non-uniform erosion, in keeping with disclosed principles;

FIG. 11(b) shows an exemplary method for heating a damaged target to regeneration temperature with coolant flow shut off, and upon melting, regenerating the target, according to an aspect of the invention;

FIG. 11(c) shows an exemplary method for regenerating a target, according to an aspect of the invention;

DETAILED DESCRIPTION OF THE INVENTION

In Situ Deposition

Figure 1:
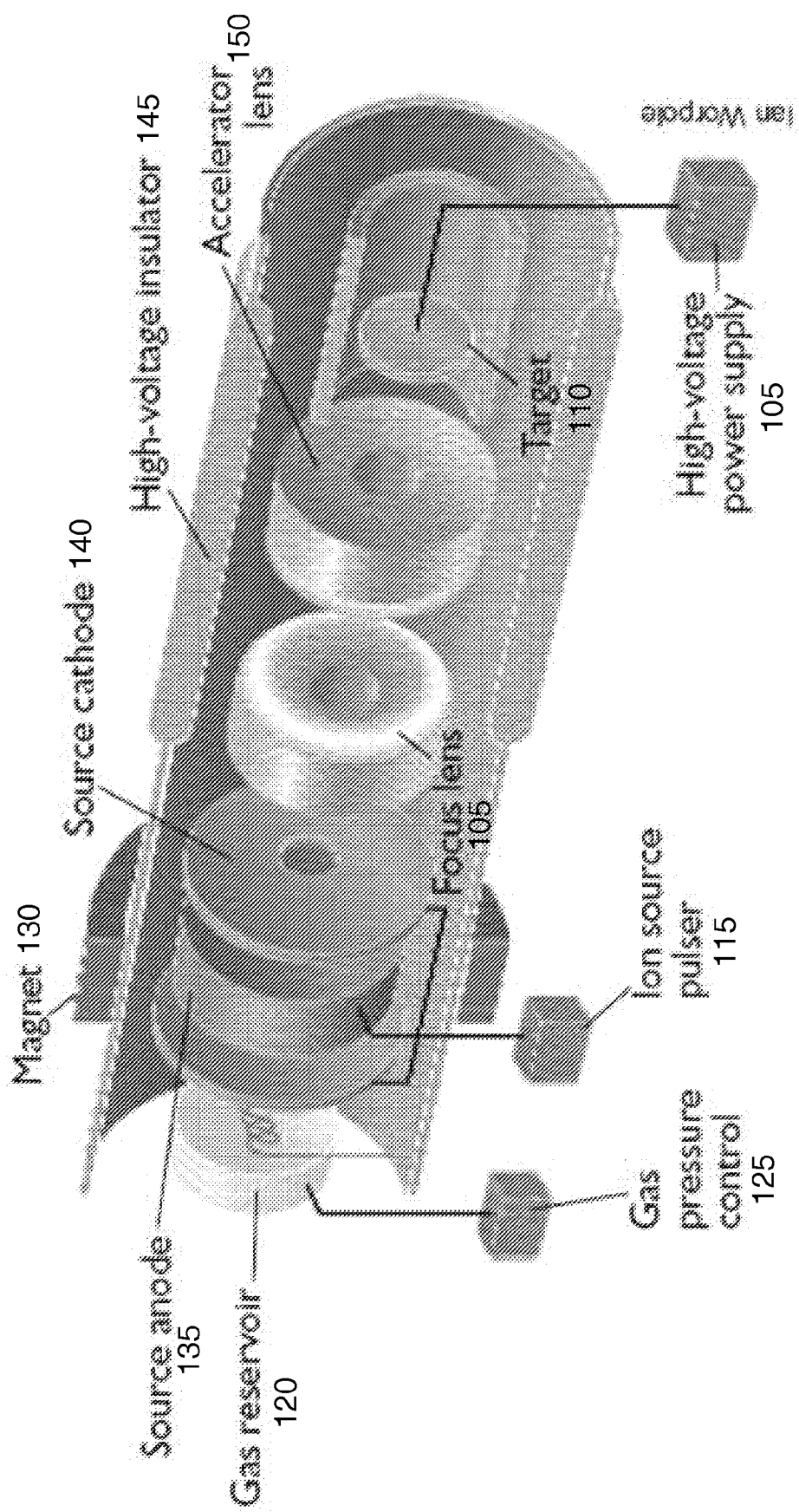
FIG. 1 is an exemplary modern compact accelerator neutron source, according to an aspect of the invention.

Aspects of the invention include methods and systems for fabricating and maintaining long lifetime targets for neutron generators and other nuclear-reaction producing devices. The nuclear reaction products generated from these devices may include, but are not limited to, neutrons, photons, protons, electrons, alpha particles, nuclides, and other nuclear reaction products generated by nuclear fusion, nuclear stripping, nuclear charge exchange, spallation, and fission processes. Further aspects of the invention may include an exemplary method of performing in-situ deposition of target material within the neutron source, either at initial fabrication, at discrete intervals during operation, or continuously during operation, to establish the target, replenish the target, and/or maintain the purity of the target. Such a technique minimizes the number of tube replacements and lowers the total cost of ownership. In addition, it minimizes neutron output performance degradation over time, lowers risk of tube failure and improves output reliability. Additional aspects of the invention include a particle source that generates particles that may collide with the target material wherein the particles may be, but not limited to, atomic and molecular ions of hydrogen isotopes, including mixtures of isotopes H$^+$, D$^+$ only, T$^+$ only, and a mixture of D$^+$ and T.

Target material in a nuclear reaction device may be deposited on the target substrate in a plurality of processes. Exemplary target materials include, but are not limited to, H, Li, Be, B, C, Ni, Na, Cu, Al, Sc, Ti, Fe, Cr, Mo, Ta, La, Sr, Y, U, Th, W, Zr, 300-series and 400-series stainless steels, and any combination, compounds, alloys, mixtures, and isotopic abundances thereof. These target materials may be used in any aspect of the invention including but not limited to, in situ deposition, in situ regeneration, selecting a high efficiency target, and selecting a neutron energy spectrum. Exemplary in situ deposition methods include evaporation or otherwise deposited from the vapor phase, sublimation, chemical vapor deposition, physical vapor deposition, sputtering, beam deposition, and flowing liquid target material.

Aspects of the invention include a particle source that generates particles that may collide with the target material wherein the particles may be, but not limited to, atomic and molecular ions of hydrogen isotopes, including mixtures of isotopes H$^+$, D$^+$ only, T$^+$ only, and a mixture of D$^+$ and T$^+$. Further aspects of the invention may include a heating process and/or cooling process as part of an in situ deposition process. Heating processes include, but are not limited to, induction heating of the target material or target substrate, beam-impingement (ion, electron or fast neutral) on the target material or target substrate, resistive heating of the target material or target substrate, convective heating via a working fluid in the target substrate, radiative heating of the target material or the target substrate, or conduction from an external heat source through the target substrate, chemical heating, electrical discharge, and coolant reduction. Cooling processes, may include, but not limited to radiative cooling, conductive cooling, convective cooling, thermoelectric/peltier cooling and others.

Figure 2:
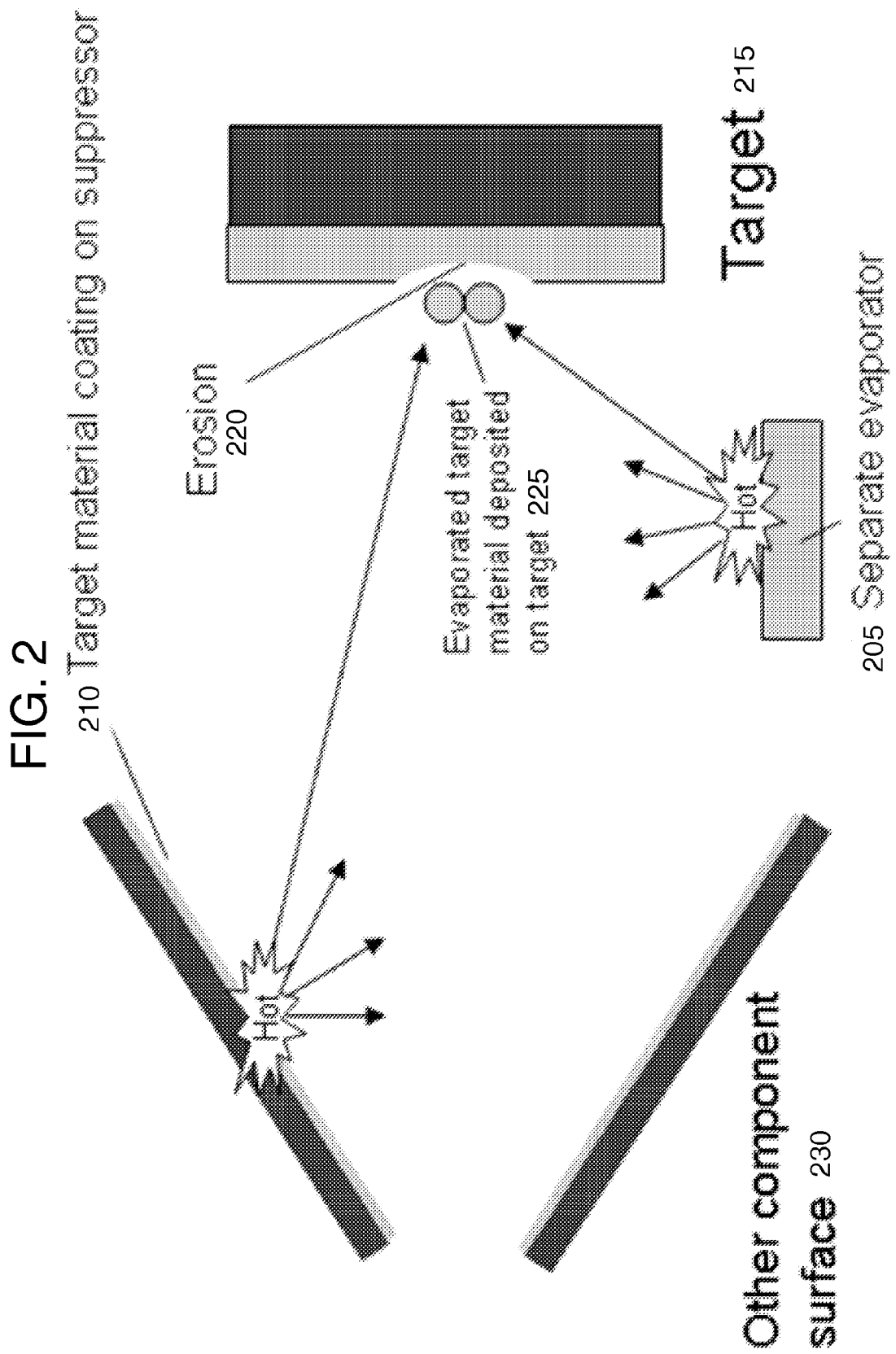
FIG. 2 illustrates an exemplary method for in situ evaporative deposition from a separate evaporator and/or a coating of target material on another surface in the generator, according to an aspect of the invention.

Evaporative deposition involves heating a reservoir (target source) of target material above the temperature where the material evaporates or sublimates, so that target material leaves the reservoir and condenses on the relatively cold target surface. Two possible embodiments of evaporative deposition are shown in FIG. 2. Persons of ordinary skill in the art understand that there are several methods that can be used to heat the target material, including, but not limited to induction, direct beam impingement, coolant reduction, resistive heating, convective heating, radiative heating, chemical heating, electrical discharge, and conduction from an external heat source through the target substrate.

In one embodiment of a heating process, the reservoir can be heated by running a large enough electrical current through either the reservoir or an adjacent heating wire, such that the heat produced from Ohmic heating (also referred to as Joule or resistive heating) is sufficient to evaporate or sublimate material from the reservoir. The electric current can be either direct or alternating current (DC or AC).

In another embodiment of a heating process, the reservoir (target source) can be heated through inductive heating. In this exemplary method, a time-varying magnetic field is used to induce eddy currents in a conducting material through electromagnetic induction. The magnetic field can be generated in a plurality of ways, including application of an alternating or radio frequency (RF) current through an electromagnet. The conducting material can be either the material reservoir itself or an adjacent heating element. The currents induced in the conducting material cause the conducting material to heat due to Ohmic/Joule/resistive heating.

In another embodiment of a heating process, the reservoir can be heated through discharge heating. The reservoir or adjacent heating element is in contact with an RF or DC plasma discharge. Surfaces in contact with plasma are continually bombarded by energetic ions and electrons from the plasma. These particles slow down in the surface material and deposit energy. Typical laboratory plasmas have temperatures in the electron Volt (eV) range, which is equivalent to in excess of 11,600 Kelvin. If the flux of energetic particles from the plasma is high enough, a significant temperature increase can be obtained in the surface. Fluxes to the surface can be enhanced if desired, for example, by making the surface act as the cathode in a DC discharge, or by applying a negative bias to the surface in an RF discharge. The negative relative potential of the surface draws in extra ions to the surface, and increases the kinetic energy of each one as it accelerates in the electric field.

In another embodiment of a heating process, the reservoir of target material can be heated by bombardment of ions or electrons from a directed beam. The particles slow down inside the target material and deposit their kinetic energy locally. The amount of energy deposited is proportional to the current of ions or electrons, and their kinetic energy (controlled by the accelerating voltage). If the particle current and kinetic energy are large enough, the temperature of the surface can be adequately raised for evaporation or sublimation to occur.

As shown in FIG. 2, the reservoir (target source) of target material for in situ evaporative deposition can be located in a plurality of locations within the neutron generator tube. It can consist of a separate evaporator reservoir placed near the target for the purpose of evaporation 205, coatings on the surfaces of other parts of the neutron generator (such as electrodes) 210, or elsewhere. The evaporator reservoir can be either an off the shelf evaporator, or can be custom made to fit inside the tube. Surfaces on parts of the neutron generator may include, but are not limited to, electrode surfaces such as the electron suppressing electrode that is typically nearest the target 210. The target material can be coated onto these surfaces during initial manufacture of the neutron generator, during a special maintenance cycle that is run after some period of use, or continually during operation of the neutron generator. Additional sources could also be any surface that has collected material that was previously eroded from the target itself. Further, in the case of discrete depositions, the reservoir could contain multiple charges so that the operation can be performed multiple times over the life of the generator. In one embodiment, the reservoir for target material to be evaporated may be a separate evaporator 205 module included in the device for the purpose of in situ evaporation of material onto the target.

An exemplary method for in situ evaporative deposition may include the steps of heating the target material in a separate evaporator 205, on a suppressor 210, or elsewhere 230, using a heating process phasing the target material into a vapor. Thereafter, the target material in a vapor phase can be deposited 225 on the target material at the target location 215 to cover the erosion 220 and other deformities on the target.

Figure 3:
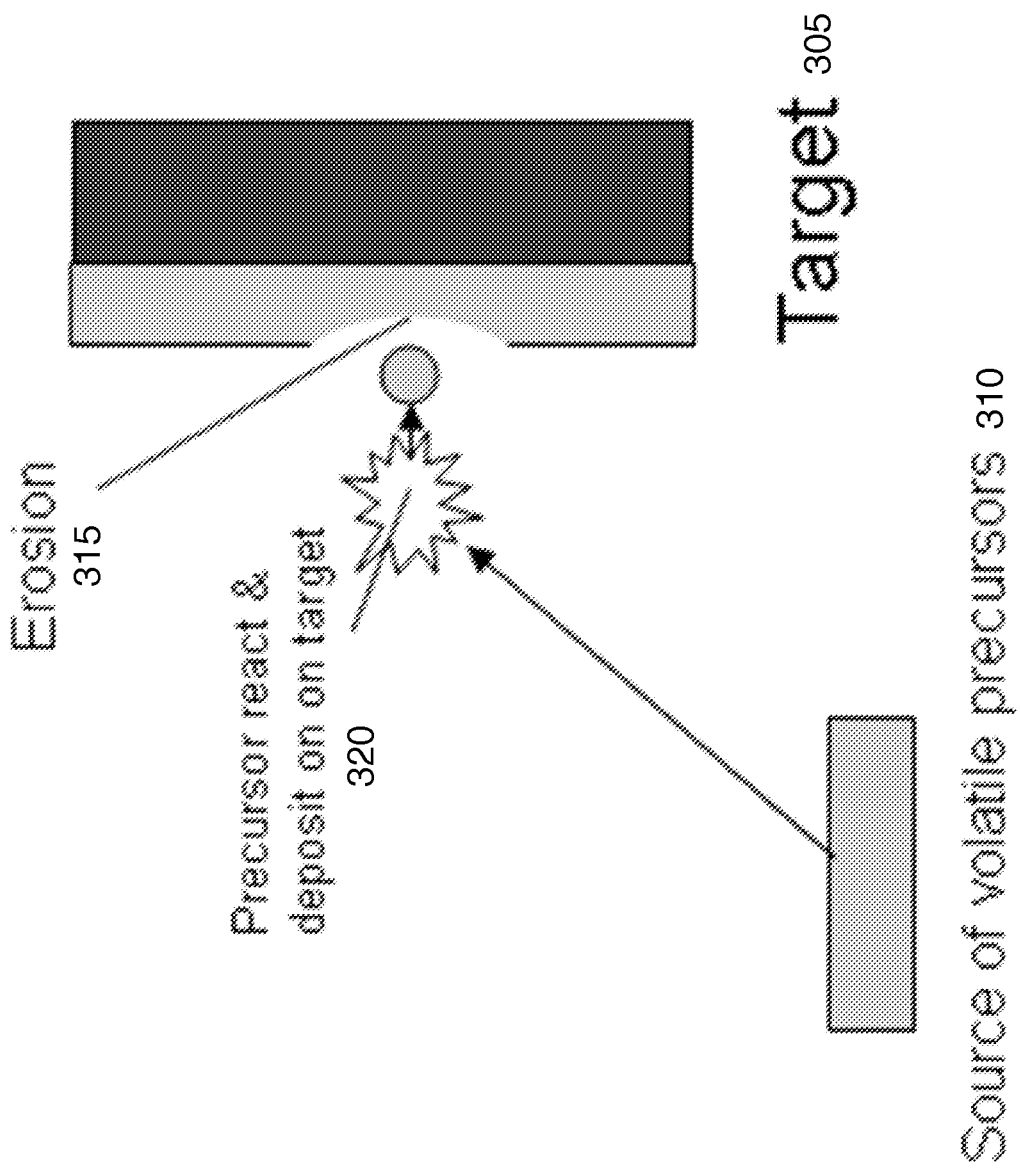
FIG. 3 illustrates an exemplary method for in situ deposition by chemical vapor deposition, according to an aspect of the invention.

Another process called chemical vapor deposition (CVD) may be used to perform in situ deposition, in which volatile growth precursors in the vapor phase react chemically with or decompose on the target surface, growing target material as a result (See FIG. 3). For example, various forms of carbon (carbon fiber, pyrolytic carbon, diamond-like carbon, carbon nanofibers or nanotubes, or others) can be grown with this method from, for example, hydrocarbon precursors.

If the crystal orientation is important, there are many options available when using CVD. Material can be deposited epitaxially, where the existing surface acts as a seed crystal and deposited material maintains the existing crystal structure. In fact the crystal structure of the deposited target material can be single crystal, polycrystalline, or amorphous as desired.

The source of target material is therefore any reservoir 310 that can release volatile precursors into the background gas at the target surface as shown in FIG. 3. Volatile precursors react and deposit 320 on the target 305 to cover erosion 315 and any other impurities at the surface of the target 305.

Figure 4:
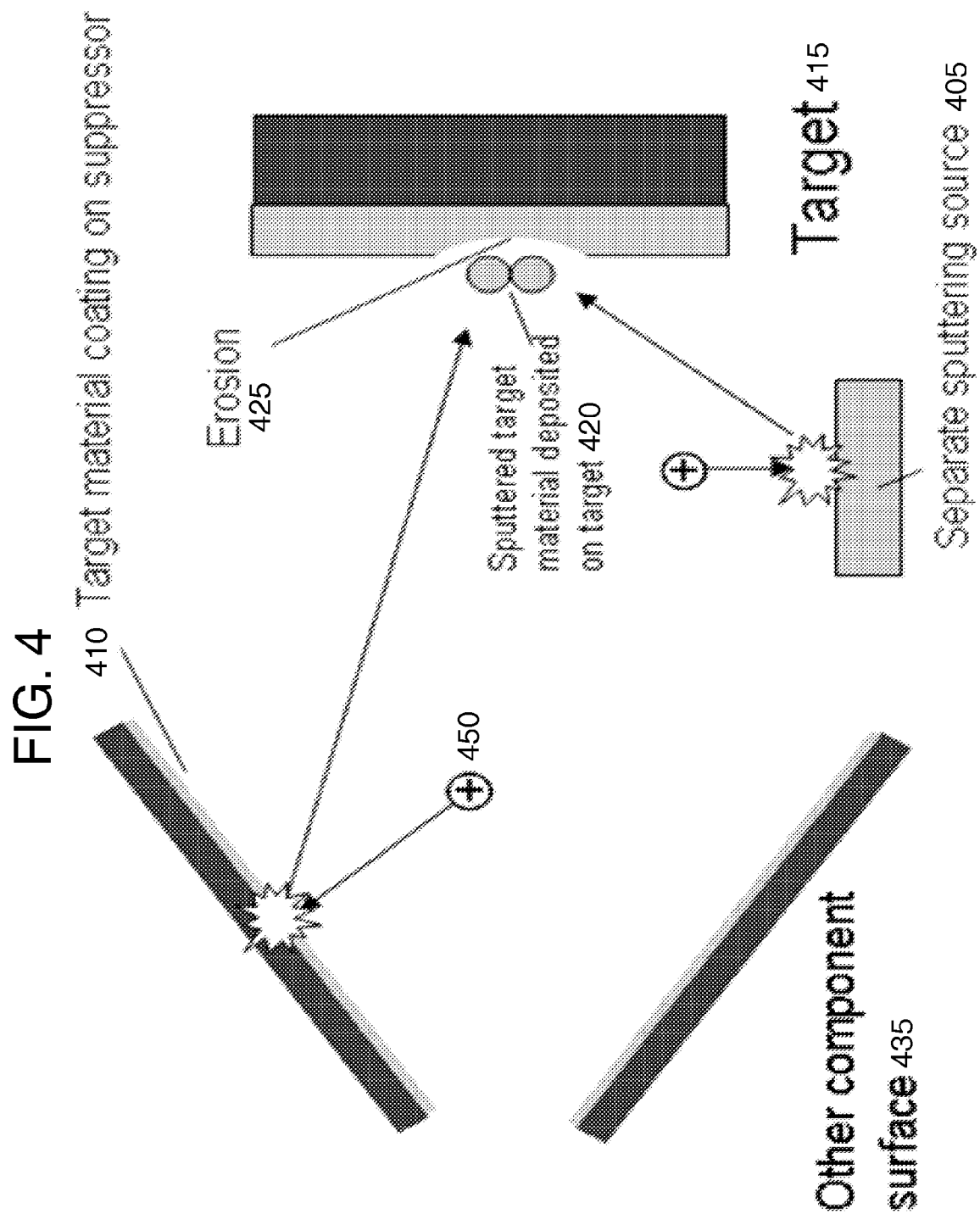
FIG. 4 illustrates an exemplary method for in situ sputter deposition from a separate sputtering source and a coating of target material on another surface in the generator, according to an aspect of the invention.

Another exemplary method of accomplishing in situ deposition of target material onto the target is sputter deposition, or physical vapor deposition (PVD). Sputtering involves bombarding a reservoir of target material with energetic ions or atoms, knocking them out of the reservoir and toward the target. A diagram of two possible embodiments is shown in FIG. 4.

Sputter deposition could occur by initiating a separate discharge or ion beam, or even as a side-effect of normal operation of the neutron generator. In one embodiment, sputtering of target material from a reservoir 405 onto the target is performed by putting the reservoir in contact with a plasma. The plasma can be generated by a direct current (DC) or radio frequency (RF) discharge. When the plasma contacts the reservoir surface, a sheath is naturally set up around the surface causing the surface to be negatively charged relative to the bulk plasma. This draws heavy, slower moving ions to the surface, while at the same time repelling light, fast moving electrons. This automatically occurs so that the fluxes of ions and electrons are equal, and the potential of the surface can reach a steady state. The sheath process naturally accelerates ions toward the surface, and depending on the plasma temperature (which affects the magnitude of the sheath potential difference), can encourage sputtering of the surface. To drastically enhance sputtering of the reservoir, it can be used as the cathode in a DC discharge or otherwise biased negative relative to the plasma. This draws a large flux of ions to the surface, each one of which will have a higher kinetic energy. Both of these results would tend to increase the sputtering rate for the kinetic energy range of interest.

In another embodiment, sputtering of target material from a reservoir onto the target is performed by aiming an energetic ion beam at the reservoir surface. The ion beam can be generated in a plurality of ways, involving a mechanism for ionization of a gas and a mechanism for accelerating the ions to the desired kinetic energy, corresponding to the desired sputtering yield or rate. In still another embodiment, sputtering of target material from a reservoir onto the target is performed by accelerating ions that are borne along the path of the neutron generator's primary ion beam, i.e., the beam that accelerates ions into the target at high enough energies for nuclear reactions to occur within the target. Along the path of this ion beam, some ionization reactions occur with the background gas. The separate reservoir or reservoir coating on a nearby surface (410, 435) is biased relatively negative to accelerate and draw in these ions. When the ions hit the reservoir, target material is sputtered 420 and can deposit on the target 415 as desired to negate the effects of erosion 425.

The reservoir of target material for in situ sputter deposition can be located in a plurality of locations within the neutron generator tube. It can either be a reservoir specifically placed near the target for the purpose of sputtering (such as a sputtering target) 405, coatings on the surfaces of other parts of the neutron generator (such as electrodes) 410, or elsewhere 435. The source could also be any surface that has collected material that was previously eroded from the target itself. Additionally, in the case of discrete depositions, the reservoir could contain multiple charges so that the operation can be performed multiple times over the life of the generator.

In another embodiment, the reservoir for target material to be sputtered is a layer of material coated onto another part of the neutron generator tube. This includes, but is not limited to, electrode surfaces such as the electron suppressing electrode that is typically nearest the target. The target material can be coated onto these surfaces during initial manufacture of the neutron generator, during a special maintenance cycle that is run after some period of use, or continually during operation of the neutron generator. This embodiment would utilize ionizations that regularly occur in the region between the electron suppression electrode and the target as a source of ions, which could then be accelerated toward the suppression electrode. The electrode surface facing the target could be coated with a layer of target material, so that as these ions continually bombard the suppression electrode during device operation, material is continuously sputtered from the electrode to the target surface. This would provide a constant source of fresh target material. In still another embodiment, the reservoir of target material is designed to be thick enough to allow multiple regeneration cycles to be carried out over the life of the neutron generator tube.

Figure 5:
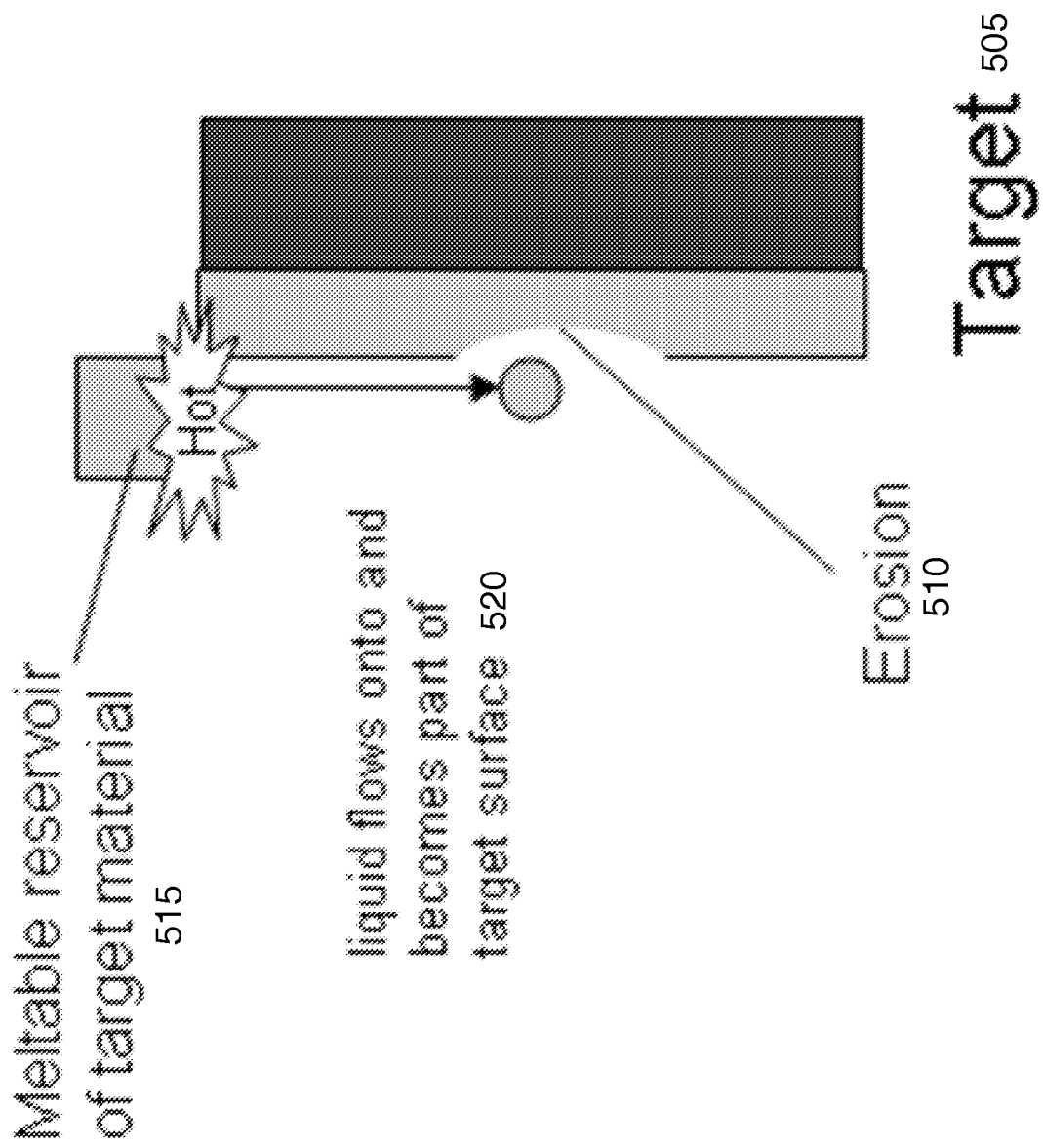
FIG. 5 illustrates an exemplary method for in situ deposition by melting and flowing additional target material to the target surface, according to an aspect of the invention.

Another method for in situ deposition of target material is to melt a reservoir (target source) 515 of solid target material, and allow the liquid target material to flow 520 to the target 505, where it then becomes part of the target and negate the effects of erosion 510, as shown in FIG. 5.

Any deposition process, including, but not limited to, evaporative deposition, CVD, sputter deposition, and deposition of target material by flowing it to the target in liquid form can be performed at a plurality of times. The methods can be performed during initial fabrication of the nuclear reaction device, discrete intervals during operation of the nuclear reaction device, during a maintenance cycle, during periodic regeneration cycles, and continuously during operation of the nuclear reaction device. In one embodiment, the selected in situ deposition process is performed when the neutron generator tube is initially fabricated. In this embodiment, the technique is used to create the initial pure target surface. In another embodiment, the in situ deposition process is performed during periodic regeneration cycles, where a fresh target surface is deposited after some amount of operation since the previous deposition. In still another embodiment, the in situ deposition process is performed continuously during operation of the neutron generator. This involves providing a constant deposition of the target material to the target surface. The deposition rate can be matched to the erosion rate of the target, to maintain a constant target thickness and purity level.

Figure 6:
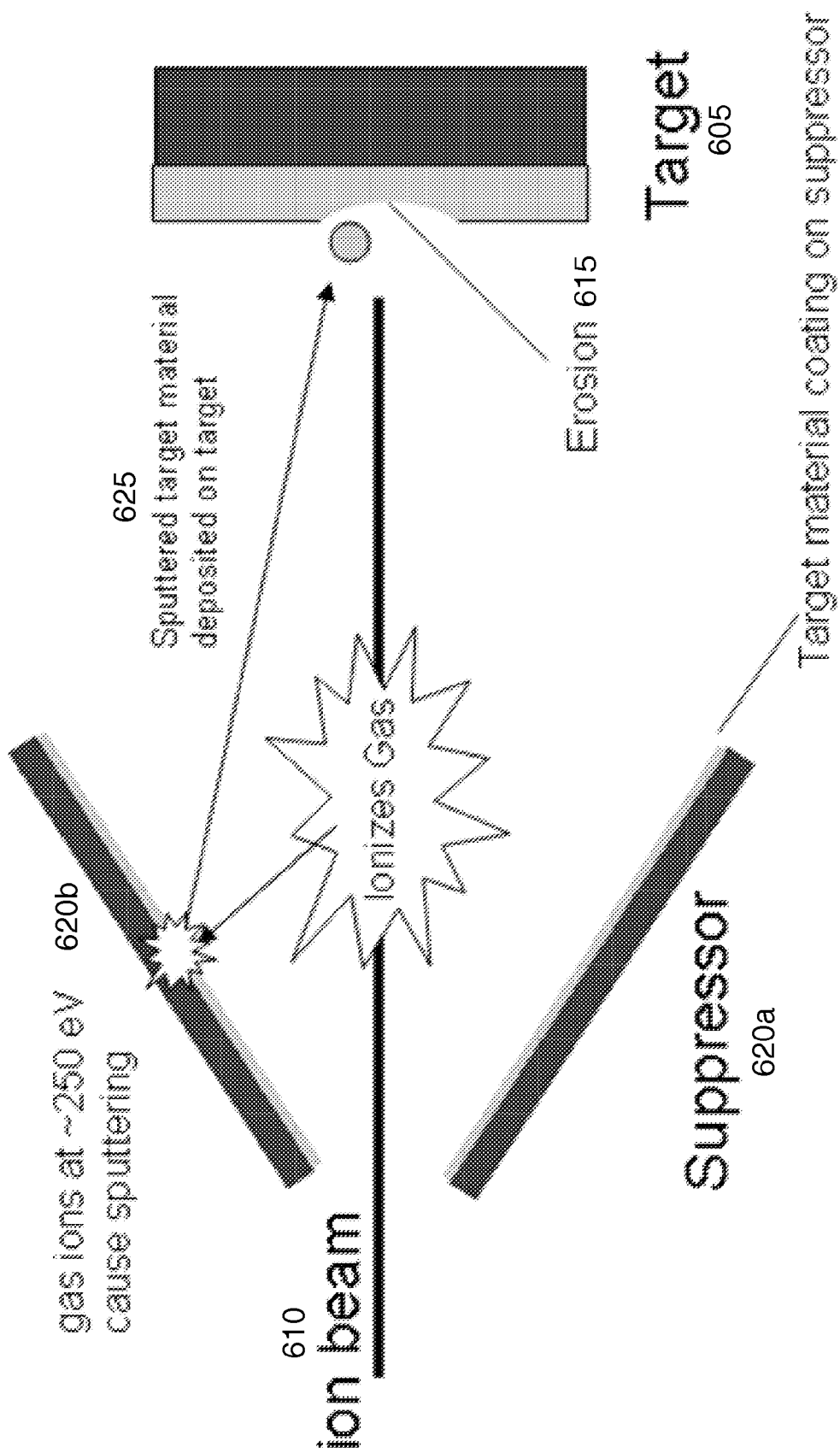
FIG. 6 illustrates a preferred embodiment for in situ target deposition, using continual deposition by sputtering material from the suppressor surface, according to an aspect of the invention.

In a preferred embodiment, target material is continuously sputter deposited 625 onto the target 605 from the surface of the electron suppressing electrode (620a, 620b) to cover up any erosion 615, as shown in FIG. 6. During normal operation of the neutron generator, the target is sputtered by the energetic ions constantly bombarding it 610. Eroded material leaves the surface in a cosine distribution. The geometry is typically such that a significant amount is deposited on the suppressor, because it is the nearest electrode. This process provides a continuous source of target material (including any impurities that were present in the target) on the suppressor.

Also during normal operation, the ion beam ionizes a fraction of background gas atoms between the suppressor and target as it passes through on its way to the target. Since the suppressor is by definition biased negative relative to the target (in order to repel or suppress electrons), the ions created in the region are naturally accelerated to the suppressor. These ions strike the suppressor surface at energies up to the target-suppressor potential difference, which is typically a couple hundred volts (but may have a range between 50 eV and 10 keV). Hydrogen ions at these energies sputter the layer of target material that is coated on the suppressor electrode. Some of the target material sputtered from the suppressor redeposit on the target. The fraction varies with the design of the target and suppressor, as well as the distance between the two, but is on the order of 15%.

Although the beam current is much higher at the target than the current of residual ions is at the suppressor (1 mA to 50 μA, for example), and the geometric probability of material sputtered from the target landing on the suppressor, and then sputtering from the suppressor back to the target is low, these are made up for by the much higher sputtering yield for ~250 eV ions on the suppressor compared to ~100 keV ions on the target (however, certain aspects of the invention provide at least one percent of the ejected material from the target source onto the target material at the target location). For deuterium ions on a lithium target, for example, the sputtering yield at the suppressor is about 74 times that at the target. This is because at the very high energies needed for nuclear reactions to occur, very little energy from the incident ion is deposited near the surface of the target. Most is deposited very deep in the material, which is not conducive to sputtering. This is because sputtering requires atoms near the surface to obtain enough energy to overcome the surface binding energy and leave the surface. Ion bombardment of the target by the primary ion beam overwhelmingly leads to ion implantation rather than surface sputtering. An end result is that it is possible to have the erosion rate from the target match the deposition rate of eroded material onto the target from the suppressor. This maintains a constant target thickness during operation.

Another advantage of this embodiment is that while both target material and impurities can be sputtered from the target by the highly energetic primary ion beam, the potential difference between the target and suppressor can be tailored such that the deuterium ions that re-sputter the target material off of the suppressor and back onto the target have enough energy to sputter the target material, but not enough energy to overcome the sputtering threshold for impurities. This is especially true if the target material is something as light as lithium. Therefore, not only can a constant target thickness be maintained via in situ deposition, but a constant (or at least more constant) target purity can be maintained as well.

In Situ Regeneration

Several exemplary regeneration methods are disclosed that can apply to a broad range of target materials for nuclear particle generation, especially neutron generation by fusion or other neutron-producing reactions, including, but not limited to, H, Li, Be, B, C, Ni, Na, Cu, Al, Sc, Ti, Fe, Cr, Mo, Ta, La, Sr, Y, Zr, U, Th, W, 300-series and 400-series stainless steels, and any combination, compounds, alloys, mixtures, and isotopic abundances thereof. Although applications to neutron generators are discussed primarily, regeneration applies to other devices that use targets to generate nuclear reaction products, such as neutrons, photons, protons, electrons, alpha particles, nuclides, and other nuclear reaction products generated by nuclear fusion, nuclear stripping, nuclear charge exchange, spallation, and fission processes. Regeneration also applies to many target, electrode, and particle beam configurations, including, but not limited to, a cylindrical target with radial particle beam flow, a planar (or disc) target with generally linear particle beam flow, or a spherical target with generally radial particle beam flow. The specific beam and target configuration is not critical to practicing the disclosed invention. The application of target regeneration to the various target materials may vary depending on the physical characteristics of the material. For example, a lithium target can exploit the liquid phase of lithium, whereas, a carbon target, which sublimes rather than melts, may require a modified approach or may experience a different degree of regeneration. Some targets, such as titanium, can undergo either mode of regeneration. For this reason the disclosed regeneration technology is divided into two categories: type-1 regeneration, in which target materials are melted (undergo a solid to liquid transition), and type-2 regeneration, in which target materials are not melted or sublimate (undergo a transition from solid to vapor phase with a negligible or nonexistent liquid phase). Lithium is an example of a material that can undergo type-1 regeneration and carbon is an example of a material that can undergo type-2 regeneration. Titanium is an example of a material that can undergo either or both types of regeneration.

Type 1 Regeneration

For Type 1 regeneration, the target layer is heated until the target material layer melts. In the molten state, the material can flow, although the flow may be dominated by surface tension and cohesion/wetting effects. Due to surface tension and wetting, the molten target material tends to form a meniscus or pool that is of substantially uniform thickness away from the boundary edge of the target material. Thus, thin portions of the target are filled by flow from thicker portions of the target. If no additional target material is added, this redistribution of target material serves to partially reverse non-uniform target erosion effects. If additional target material is added, then the target can be restored to its original dimensions, resulting in an effectively new target.

Because the target material is brought to a molten state, there is negligible stress in the material (the molten material is free to flow to relieve stress) and, depending on the cooling rate temperature distribution and material, lower stress can be achieved in solid state. The material can also rewet the target substrate for renewed adhesion if delamination or blistering has occurred. Reaching a molten state also removes any material cracks and reabsorbs potential flakes of material.

Figure 7:
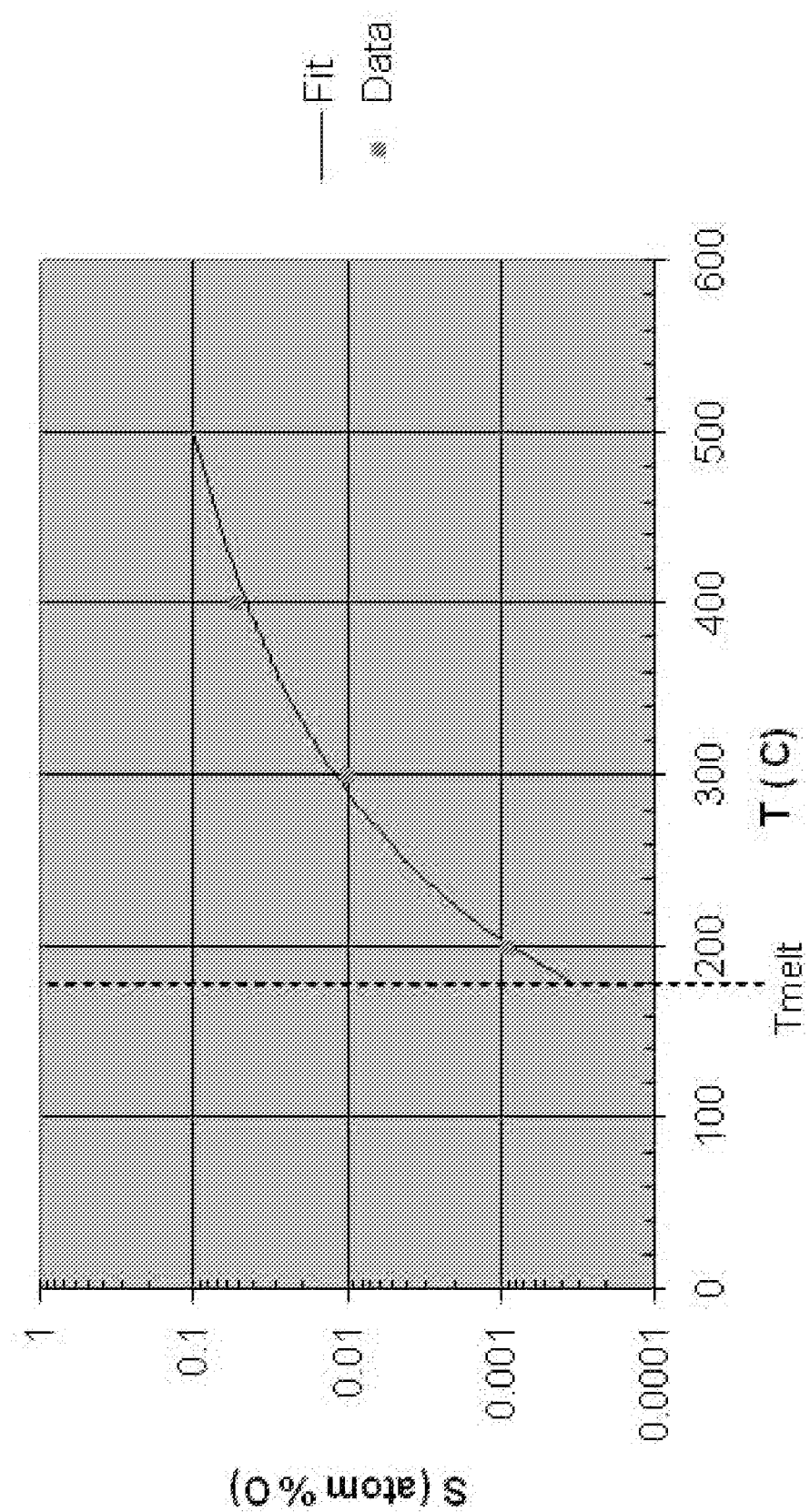
FIG. 7 is a chart of the solubility of oxygen in liquid lithium in keeping with disclosed principles.

While in the molten state, other target degradation mechanisms can be reversed or mitigated. In general, the solubility and diffusivity of metallic and non-metallic impurities in a target material (that are not driven off by the temperature required to melt the target) increase with increasing temperature. Sources of such impurities include solvation of substrate material, sputtering and evaporation of other generator components (such as electrodes and insulators), off-gassing and small leaks in the vacuum envelope. The solubility of an impurity in the molten target material depends on temperature and generally increases with increasing temperature, as shown in FIG. 7 for the case of oxygen in lithium. Thus, if large quantities of impurities are present on the surface of a target, a larger temperature may be required to dissolve these impurities into the bulk of the target material. Upon cooling, much of these impurities can be trapped in the bulk of the material, away from the surface of the material and/or the beam-interaction area where they may have a negative impact on neutron output by increasing the stopping-power near the surface of the target and/or diluting the reacting species density. The reacting species may be the target material itself, such as lithium, or an implanted/dissolved species, such as deuterium or tritium in a lithium target.

In addition to sequestration of contaminant metals and non-metals in the bulk of the target materials, stresses due to beam-particle build-up and embrittlement can be relieved. In the specific case of hydrogen isotopes (hydrogen, deuterium or tritium), hydrides of the target material cause the target to become brittle and impermeable. Embrittlement can lead to cracking and flaking that can result in particulate formation which can rapidly limit operation of the neutron generator, often through failure at high voltage. In addition, the implanted beam particles can build-up in the target material, inducing stress, causing swelling/shrinking and blistering of the target material. In the molten state, hydrides (and deuterides and tritides) can be dissolved into the bulk of the melt, releasing the hydride (deuteride or tritide) bonds and allowing the hydrogen (deuterium or tritium) to diffuse more easily in the melt. Because the diffusion coefficient of hydrogen in solution with the target material is high at elevated temperatures, these dissolved hydrogen isotopes are free to leave the target material and enter into the vacuum envelope where the gases can be stored and reused. The gases built-up in the target, which are predominantly hydrogen isotopes and isotopes of helium resulting from fusion reactions and/or radioactive decay of reaction species or reaction products, are also released during this process by the same diffusion mechanism. When the target material is resolidified by allowing it to cool through a cooling process, it is substantially free of trapped gases and hydrides (deuterides and tritides), it is more pure and uniform in thickness, its adhesion to the target substrate is improved/reestablished and surface impurities have been reduced, thus the target has been regenerated to a state that better approximates a new target, extending the usable life of the neutron generator.

A Preferred Embodiment

Beam Heating of a Lithium Target

Figure 10:
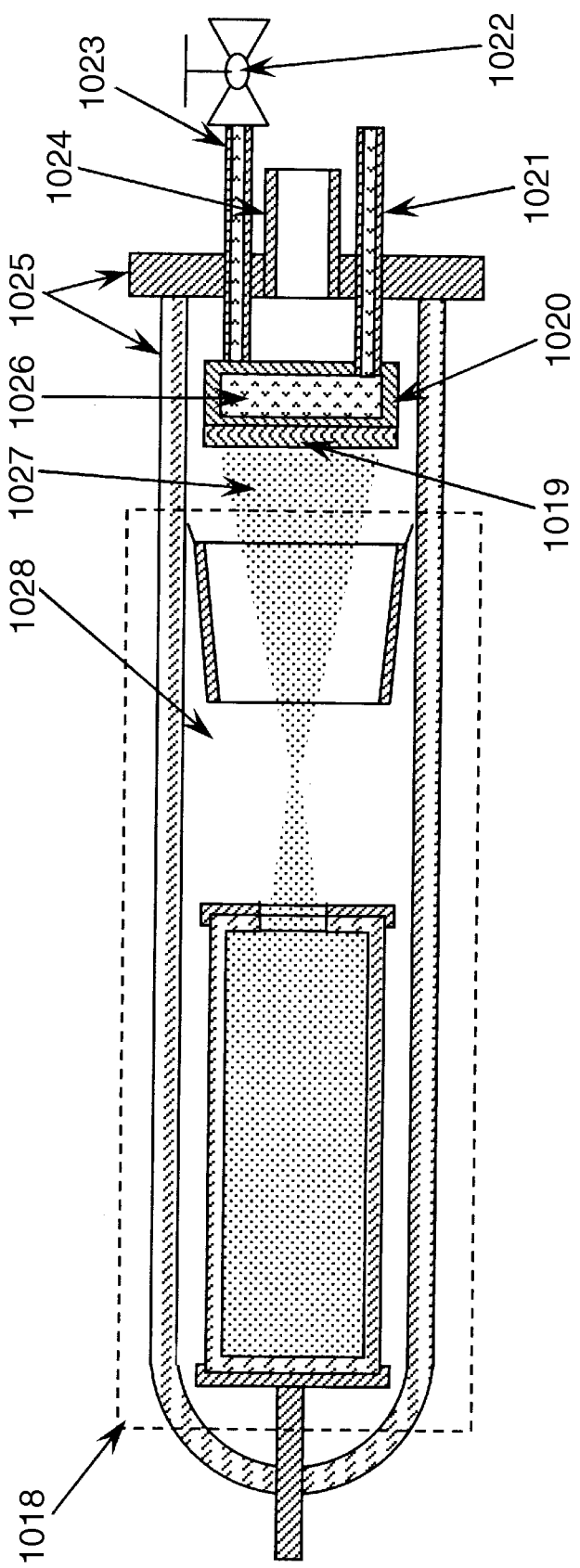
FIG. 10 shows an exemplary method for regeneration using ion-beam heating of a lithium target (type-1 regeneration), according to an aspect of the invention.

A preferred embodiment of target regeneration that has been incorporated into a neutron generator, as shown in FIG. 10. A particle beam 1027 composed of deuterium ions (molecular and/or atomic deuterium ions) is formed and accelerated by the ion accelerator 1018. This beam impinges on a substantially planar side of a disc-shaped target made of approximately 500 μm of lithium metal 1019 which was deposited onto a nickel substrate 1020. The substrate contains a cavity to allow convective heat transfer between the substrate and the liquid water coolant 1026. The water flow is controlled by a valve 1022 on the coolant inlet tube 1023. The water exits the substrate cavity via the coolant outlet tube 1021. The target material 1019 is cooled by conduction to the substrate 1020. The substrate and coolant tubes are sealed to ensure no exposure of the target material 1019 or the internal vacuum enclosure 1025 to the coolant. The interior of the vacuum enclosure 1025 is evacuated except for a small quantity of deuterium fill gas 1028. The fill gas pressure is controlled by a pressure control system attached to the vacuum envelope 1025 at a location 1024 behind the target substrate.

During normal operation, the particle beam 1027 both implants deuterium atoms in the target layer 1019, and causes fusion to occur between the beam ions and both the deuterium atoms implanted in the target layer and the lithium from which the target is made. Neutrons are released by these fusion reactions and escape the generator, and the other products of the fusion reactions and/or radioactive decay (helium-3, helium-4, tritium, and beryllium) can remain in the target layer. The cooling water is flowing during normal operation to keep the target temperature low. By maintaining a low temperature, the implanted deuterium is held in the lithium target material, which provides a high density of deuterium nuclei with which the deuterium ions in the particle beam can fuse.

The particle beam 1027 also causes sputter erosion, albeit slowly, that can cause some portions of the target layer 1019 to become thinner than the rest of the target layer. Over time, offgassing from materials within the vacuum envelope may also form a layer of contaminants on the surface of the target layer. The particle beam implants deuterium in the target layer, which can react with the lithium metal to form lithium hydride. The implanted deuterium can also build up into small gas pockets. The gaseous fusion products of helium and tritium can also be trapped within the target layer, causing stress in the layer and possibly forming gas pockets, and the tritium can form lithium tritide.

While deuterium retention in the target material is beneficial for increasing the deuterium fusion rate in the target, if too much hydride is formed, too many gas pockets are formed, too much swelling/shrinking occurs, and/or gas pockets agglomerate and become too large, the target layer can be degraded by blistering, cracking, flaking, delamination from the substrate and other undesirable target degradation mechanisms that can shorten the usable lifetime of the neutron generator. Thus, it is beneficial to periodically regenerate the target. FIGS. 11(*a*)-(*c*) illustrate the steps involved in regenerating such a degraded target, starting with the degraded target condition that contains most of the possible maladies mentioned above. Regeneration can be used to remedy a much less degraded target, and regeneration is best carried out before macroscopic defects, such as blisters, delamination and bulk hydride formation, are exhibited.

FIGS. 11(*a*)-(*c*) are diagrams of a lithium target with severe signs of degradation; specifically, surface impurities 1135, bulk hydride deposits 1134, trapped gas 1130, blistering 1132, cracking 1133, and non-uniform erosion 1129. In this embodiment, the heating mechanism is particle-beam heating, so the particle beam 1127 remains on throughout the regeneration. The input power can be throttled by changing the beam energy (applied voltage). The cooling mechanism for the target 1119 is conduction into the substrate 1120 which is, in turn, cooled by forced convection using water 1126 on the interior of the substrate 1120. To start the regeneration, the water flow is shut off, and the particle beam 1127 is left on, but possibly lowered in energy to slow the heating rate. When the target material 1119 melts, non-uniformities are leveled by surface tension, cracks are filled as the target material flows, delaminated portions of target material flow back onto the target and re-adhere, and gas trapped under blisters diffuses, or bursts out, of the target material and the blister collapses and reforms with the bulk. Also occurring simultaneously, although more slowly, is that trapped gases diffuse out of the target, deuterides are dissolved into the bulk of the target material and the resulting dissolved deuterides also diffuse out of the target, and contaminants are dissolved and dispersed, also by diffusion, in the bulk of the target material. If needed, the temperature of the target material can be further increased to speed salvation and diffusion of impurities and gases by increasing the particle beam energy. Increasing the target temperature also increases the solubility of contaminants in the target material, thereby allowing a larger quantity of contaminants to be dispersed. The final step in regeneration is to restore target coolant flow, which solidifies the target with the impurities remaining dispersed and trapped in the bulk of the target material, rather than on its surface. At this point generator operation can return to a normal mode, however, some time may be required for the neutron generator to reach full yield because the deuterium in the target has been removed by the regeneration process and is built back up by the particle beam implanting deuterium into the target, as might be done with a newly manufactured target.

Type 2 Regeneration

Type 2 regeneration applies to target materials that sublimate rather than melt (non-melting materials) and to materials that do not require melting. Carbon is an example of a target material that sublimes. Because this method of regeneration does not involve transition to a liquid state, reflow of the target material does not apply, however, other target damage mechanisms can be mitigated or reversed. Impurities on the target surface, such as sputtered or evaporated metals or non-metals from electrodes or insulators, contaminants from offgassing, or small vacuum envelope leaks, can be driven off by heating the target material. This is especially true of carbon. Many materials vaporize before carbon sublimes because of its extraordinarily-high sublimation temperature. As with Type 1 regeneration, impurities can be diffused/absorbed/intercalated into the bulk of the target material so that they are removed from the surface where the particle beam interacts, thereby restoring efficient operation of the target. Other materials, such as titanium, can absorb impurities, such as oxygen or nitrogen, into the bulk of the material by diffusion. Titanium can also undergo Type 1 regeneration.

Built-up hydrogen isotopes and other trapped gasses (such as helium fusion products) can also be removed from non-melted materials by heating, since the diffusion coefficient of gases in solids also generally increases with increasing temperature, allowing the escape of trapped gas. Such degassing also relieves stress in the material caused by gas atoms, gas molecules and gas pockets trapped in the material, which prevents mechanical failure of the target. Thus, Type 2 regeneration can reduce impurities, and relieve stress in target materials that lead to target failure, thereby, extending the usable lifetime of the neutron generator. Mitigation of blistering and delamination can reduce the risk of material entering a region of high electric field and causing field emission and arc events that can damage or destroy the device.

Target regeneration technology can be applied to many existing neutron generator designs with some design modifications to accommodate target heating and cooling requirements.

Embodiment

Carbon Target with Inductive Heating

Figure 8:
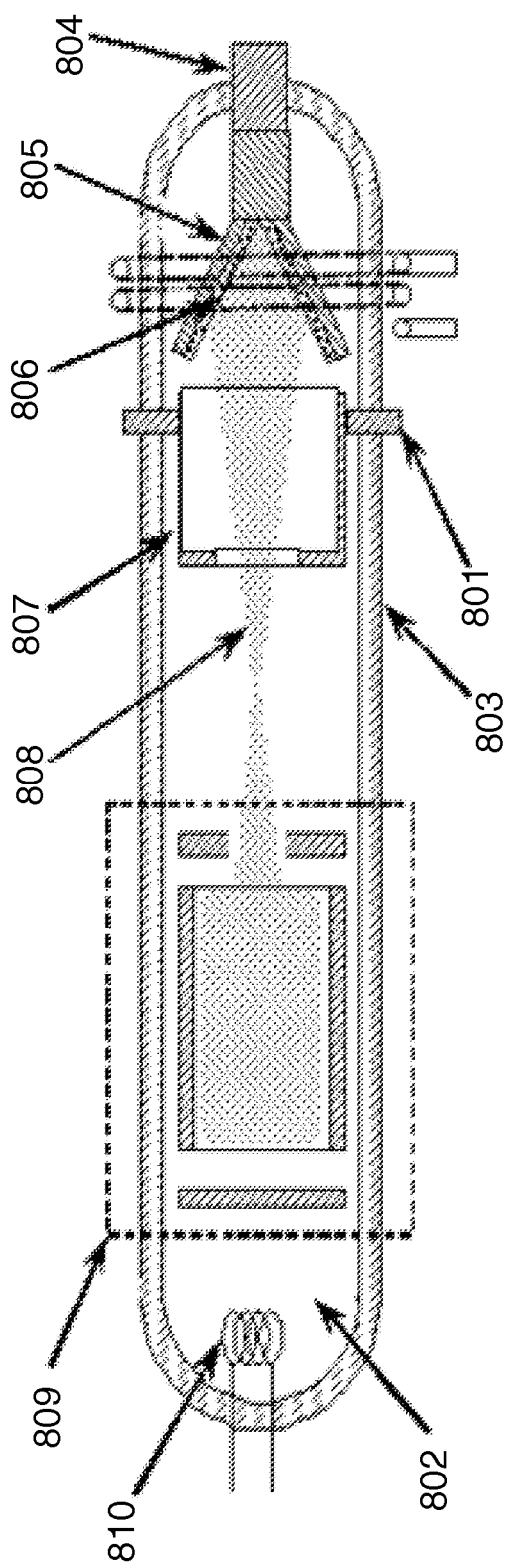
FIG. 8 shows an exemplary method for regeneration by inductive heating of carbon target (type-2 regeneration), according to an aspect of the invention.

One embodiment of a neutron-generator incorporating Type 2 target regeneration is shown in FIG. 8. A particle beam 808 composed of deuterium ions (molecular and/or atomic deuterium ions) is formed in the ion source 809 and accelerated by the accelerator electrode 807. This beam impinges on the interior of a conical target made of approximately 10 µm-100 µm of carbon 806 which is deposited onto a molybdenum substrate 805. The substrate is attached to a copper heat sink 804 to allow efficient conductive heat removal from the substrate and, thereby, from the target. The heat sink 804 is sealed to the vacuum envelope 803 to maintain an evacuated condition within the vacuum envelope. The interior of the vacuum enclosure 803 is evacuated except for a small quantity of deuterium fill gas 802. The fill gas pressure is controlled by a pressure control system (a getter) 810 within the vacuum envelope 803 at a location behind the ion source 809.

During normal operation, the particle beam 808 both implants deuterium atoms in the target layer 806, and causes fusion to occur between the beam ions and the deuterium atoms implanted in the target layer. Neutrons are released by these fusion reactions and escape the generator, and the other products of the fusion reactions and radioactive decay products (helium-3, helium-4, and tritium) can remain in the target layer or diffuse out of the target layer into the vacuum envelope. The target is continuously cooled by conduction. By maintaining a low temperature, the implanted deuterium is held in the carbon target material which provides a high density of deuterium nuclei with which the deuterium ions in the particle beam can fuse.

The particle beam 808 may also cause sputter erosion, albeit slowly, that can cause some portions of the target layer 806 to become thinner than the rest of the target layer. Over time, sputtering of other materials in the neutron generator (electrodes and insulator material), both from the particle beam and from any secondary plasma generation near the target, may deposit a layer of contaminants on the surface of the target layer, which may degrade the effective beam energy in the target material and, hence, degrade efficiency. The particle beam implants deuterium in the target layer, which can react with the carbon to form hydrocarbon compounds ($C_xD_y$) or can be held in the target by surface binding energy effects, particularly if the carbon is amorphous or polycrystalline and, therefore, has a great deal of free active surface for bonding. The implanted deuterium can also build up into small gas pockets that can damage the target material if they induce too much stress in the target material. The gaseous fusion products of helium and tritium can also be trapped within the target layer, causing stress in the layer and possibly forming gas pockets or tritiated carbon compounds.

While deuterium retention in the target material is beneficial for increasing the deuterium fusion rate in the target, if too many gas pockets are formed, and/or gas pockets agglomerate and become too large, the target layer can be degraded by blistering, cracking, flaking, delamination from the substrate and other undesirable target degradation mechanisms that can shorten the usable lifetime of the neutron generator. Thus, it is beneficial to periodically regenerate the target before and after these effects occur. Because graphite is a refractory material that sublimes rather than melting, the ability to reflow target material to re-adhere the target material to the substrate or redistribute target material to fill thin regions is limited because solids do not flow well. However, regeneration can be used to prevent damaging gas buildup by providing a means to degas the target. Furthermore, the refractory nature of graphite allows deposited contaminants to be decomposed, vaporized, and/or melted and diffused into the bulk of the target, thus mitigating the effects of deposited contaminants. Regeneration can also be used to remedy less degraded target, and regeneration is best carried out before macroscopic defects, such as blisters or delamination, are exhibited.

This embodiment discloses an exemplary method for regenerating a carbon target, however, this exemplary method can be easily extended to other non-melted target materials. Further in this embodiment, the heating mechanism or process is inductive heating because this provides a rapid means of heating the target material to very high temperatures, which may be required for carbon regeneration, and can accomplish heating quickly so that the heat load to surrounding components can be minimized, however, other heating techniques are possible. The particle beam can be either on or off during regeneration. Conductive cooling is used in this embodiment, however, other cooling techniques can be used. The input power can be throttled by changing the power delivered to the induction coil. The cooling mechanism for the target is conduction into the substrate which is, in turn, cooled by conduction to an external (outside of the vacuum envelope) heat sink. To start the regeneration, the induction coil is energized. The induction coil induces electric current in the target layer and the target substrate, which Ohmically heats these materials. The total induction power required to achieve regeneration depends on the temperature needed to regenerate the target, the coupling efficiency between the induction coil and the target material and target substrate, and the cooling rate of the target substrate, and is unique to a given specific neutron generator design.

The temperature needed to regenerate a target depends on what aspect of regeneration is desired. If only hydrogen release is desired, then a lower temperature ~500 C can be used to allow diffusion and degassing. Lower temperatures are also possible, if longer heating times are tolerable, and higher heating temperatures can be used if a quicker regeneration is desired. For regeneration to remove contamination, higher temperatures may be required. For metallic compounds, for example, material sputtered from nearby electrodes, it may be possible to either absorb the contaminant into the bulk of the target material, in which case the minimum regeneration temperature is the temperature at which the contaminant can diffuse in carbon, or evaporate the contaminant, in which case the minimum regeneration temperature is the temperature at which the vapor pressure (atoms flux) of the contaminant material is high enough to remove the contaminant material within the time limits imposed by heating of the surrounding neutron generator components. Non-metallic contaminants, such as some ceramics, can be decomposed at high temperature, releasing a gas-phase component (such as oxygen or nitrogen) and leaving behind a metallic/semimetallic material (such as aluminum, silicon or boron) that can either be evaporated or diffused into the target. In both cases, the amount of surface contamination, which is where contaminants have their most costly effect, can be reduced by regeneration. The regeneration cycle is ended by de-energizing the induction coil.

Embodiment

Titanium Target with Appropriate Heating Process

Figure 9:
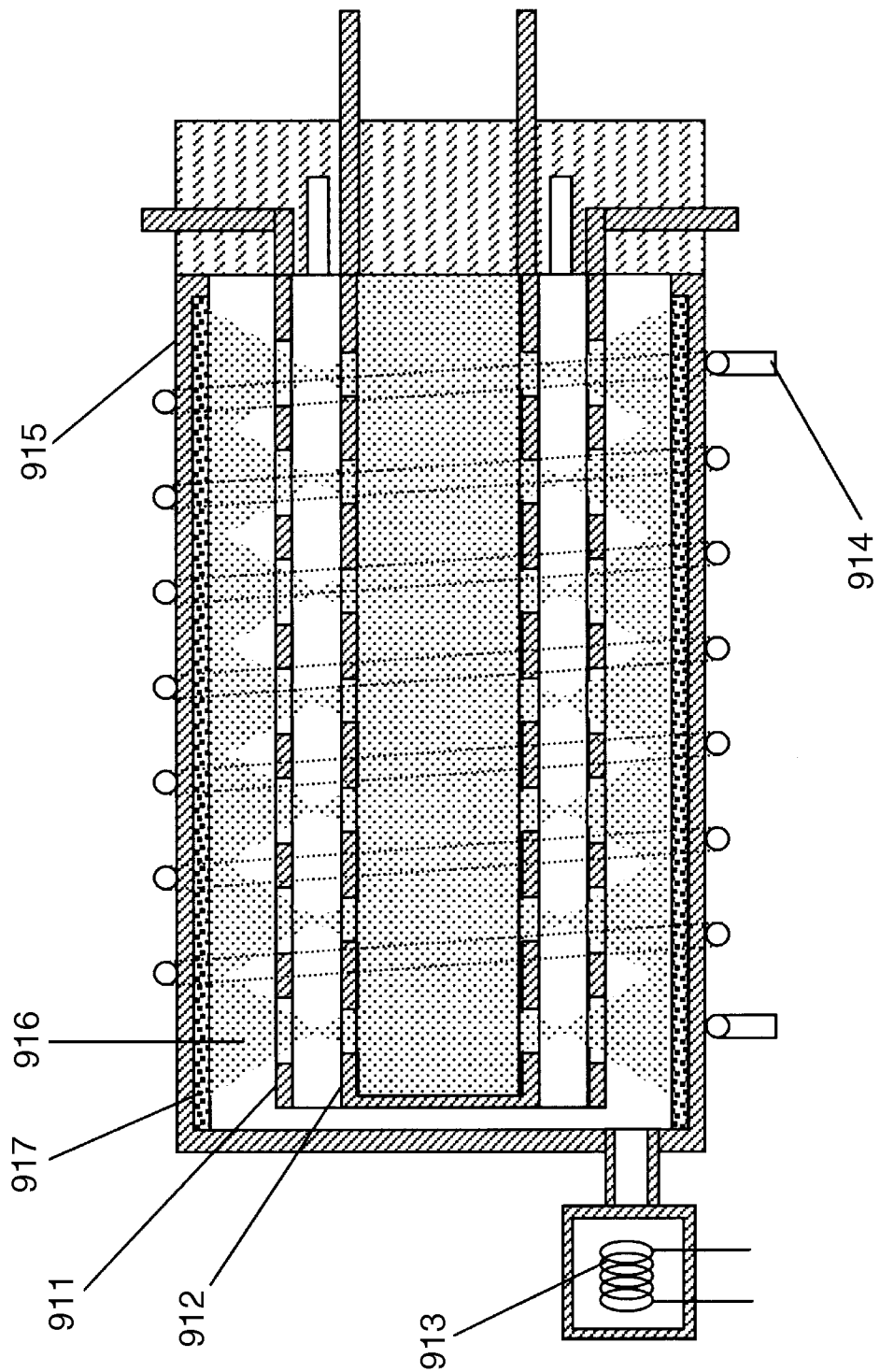
FIG. 9 shows an exemplary method for regeneration by inductive heating of a titanium target (type-1 or type-2 regeneration), according to an aspect of the invention.

Another embodiment of a neutron-generator incorporating target regeneration is shown in FIG. 9. Several particle beams 916 composed of deuterium and/or tritium ions (molecular and/or atomic deuterium ions) are formed in the ion source 912 and accelerated by the accelerator electrode 911. These beams impinge on the interior of a cylindrical target made of approximately 10 µm-100 µm of titanium 912 which is deposited onto a stainless steel substrate 915. The titanium may be bonded to the stainless steel substrate with one or more additional grafting layers or diffusion barriers, such as molybdenum and vanadium, to promote better adhesion and/or limit leakage of gas into or out of the vacuum envelope 915. The target material can also be the target substrate in some cases, however, this may lead to problems with tritium inventory for deuterium-tritium neutron generators, for example. The substrate, which also constitutes part of the vacuum envelope 915, is water cooled by cooling coils 914 on its exterior. The interior of the vacuum enclosure is evacuated except for a small quantity of deuterium fill gas. The fill gas pressure is controlled by a pressure control system (a getter) 913 within the vacuum envelope 915.

During normal operation, the particle beams 916 both implant deuterium atoms in the target layer 917, and causes fusion to occur between the beam ions and the deuterium atoms implanted in the target layer. Neutrons are released by these fusion reactions and escape the generator, and the other products of the fusion reactions (helium-3, helium-4, and tritium) can remain in the target layer or diffuse out of the target layer into the vacuum envelope. The target is continuously cooled by conduction to the stainless steel substrate, which is cooled by water-fed cooling coils. By maintaining a low temperature, the implanted deuterium is held in the titanium target material, as a solid solution and/or by chemical bonding. This provides a high density of deuterium nuclei with which the deuterium ions in the particle beam can fuse.

The particle beam 916 also causes sputter erosion, albeit slowly, that can cause some portions of the target layer 917 to become thinner than the rest of the target layer. Over time, sputtering of other materials in the neutron generator (electrodes and insulator material), both from the particle beam and from any secondary plasma generation near the target, deposit a layer of contaminants on the surface of the target layer, which degrade the effective beam energy in the target material and, hence, degrade efficiency. Small leaks and off-gassing can also introduce impurities, such as oxygen and nitrogen, which react with the target surface to form a contaminant layer which also degrades efficiency and may prevent gas permeation. The particle beam implants deuterium in the target layer, which can react with the carbon to form titanium hydride (TiD2), which is brittle and relatively impermeable, or can be held in solid solution with the target material (TiD$_x$; x<2). The implanted deuterium can also build up into small gas pockets that can damage the target material if they induce too much stress in the target material. The gaseous fusion reaction and/or decay products of helium and tritium can also be trapped within the target layer, causing stress in the layer and possibly forming gas pockets or tritiated titanium compounds.

While deuterium retention in the target material is beneficial for increasing the deuterium fusion rate in the target, if too many gas pockets are formed, too much brittle hydride forms, too much swelling/shrinking occurs, and/or gas pockets agglomerate and become too large, the target layer can be degraded by blistering, cracking, flaking, delamination from the substrate and other undesirable target degradation mechanisms that can shorten the usable lifetime of the neutron generator. Thus, it is beneficial to periodically regenerate the target before these effects occur. Because titanium has a high-melting point, it may not be desirable to melt the target with every regeneration. Melting of the target material can be accomplished and is useful for rebonding target material to the target substrate, leveling surface non-uniformities (attaining a uniform thickness of material on the substrate to alleviate non-uniform erosion effects), and relieving material stress. While melting (Type 1 regeneration) thoroughly regenerates the target, particularly if the target is heavily damaged by blistering, cracking, erosion or delamination, targets with lesser damage, or targets that may be susceptible to undesirable phase transition during annealing (for example transition from an α/β-phase to a brittle ω-phase), may benefit from a lower-temperature (Type 2) regeneration, which is easier to carry out. Non-melting regeneration (Type 2) allows removal/dilution of contaminant layers, degassing, solvation and removal of brittle hydrides, diffusion of other forms of trapped hydrogen and gas pockets, and possibly annealing of the target material to remove stress or other unwanted aging effects (beam-induced phase transition, for instance). Regeneration can be used to prevent damaging gas buildup by providing a means to degas the target. Furthermore, the refractory nature of titanium allows deposited contaminants to be decomposed, vaporized, dissolved, and/or melted and diffused into the bulk of the target (depending on the specific contaminant and the amount of contamination), thus mitigating the effects of deposited contaminants. Regeneration is best carried out before macroscopic defects, such as blisters, delamination and bulk hydride formation, are exhibited.

The exemplary method disclosed in this embodiment can be used to regenerate a titanium target, and can be easily extended to other target materials. In this embodiment, the heating mechanism is particle-beam heating because this provides a rapid means of heating the target material to very high temperatures, and can accomplish heating quickly so that the heat load to surrounding components, and unnecessary heating of the outer portion of the target substrate, can be minimized, however, other heating techniques are possible. Conductive cooling from the target material to the substrate with a liquid-cooled substrate is used in this embodiment, however, other cooling techniques can be used. The input power can be throttled by changing the power delivered to particle beam. Temperature can be controlled continuously by controlling the beam power, the cooling rate, or both, which allows the temperature profile across the material to be controlled. To start the regeneration, the coolant flow is decreased or stopped, while the particle beam is left on, but possibly with decreased beam power to control the rate of temperature rise and/or the ultimate temperature reached by the target material. The choice of net power input depends on the surroundings and detailed structure of the neutron generator and is unique to a given neutron generator design and its surroundings.

The temperature needed to regenerate a target depends on what aspect of regeneration is desired. If only hydrogen release is desired, then a lower temperature, for instance ~400 C for titanium hydride decomposition, can be used for nearly complete degassing. Lower temperatures are also possible, if longer heating times are tolerable, and higher heating temperatures can be used if a quicker regeneration is desired. For regeneration to remove contamination, higher temperatures may be required, depending on the type(s) of contaminant(s) and the degree of contamination. If the contaminants are high-vaporization materials and their amounts are small enough, then the contaminant material can be diffused into the bulk of the target material to leave fresh surface behind, while still maintaining the target in a solid state.

For higher contaminant levels, and/or less soluble contaminants, melting may be needed to allow diffusion/dispersion into the bulk. Some contaminants may be thermally decomposed, and their subsequent decomposition products dealt with more easily. For metallic compounds, for example, material sputtered from nearby electrodes, it may be possible to either absorb the contaminant into the bulk of the target material, in which case the minimum regeneration temperature is the temperature at which the contaminant can diffuse in titanium, or evaporate the contaminant, in which case the minimum regeneration temperature is the temperature at which the vapor pressure (atoms flux) of the contaminant material is high enough to remove the contaminant material within the time limits imposed by heating of the surrounding neutron generator components. Non-metallic contaminants, such as some ceramics, can be decomposed at high temperature, releasing a gas-phase component (such as oxygen or nitrogen) and leaving behind a metallic/semimetallic material that can either be evaporated or diffused into the target. In both cases, the amount of surface contamination, which is where contaminants have their most costly effect, can be reduced by regeneration. The regeneration cycle is ended by increasing coolant flow and/or decreasing beam power, depending on the desired rate of cooling and desired degree of control.

The embodiments of regeneration described herein are carried out at initial fabrication of the nuclear reaction device (e.g., after deposition), discrete intervals during operation of the nuclear reaction device, and continuously during operation of the nuclear reaction device. However, the batch mode is preferable because it allows higher hydrogen concentrations during normal operation, and thus, higher reaction-rate efficiency. In a continuous regeneration mode, the increased diffusion of implanted hydrogen isotopes can be mitigated by increasing beam intensity (loading rate) to restore some lost efficiency from continuous operation at elevated temperatures, but this comes at the expense of more rapid material erosion rate. A more rapid erosion rate would lead to more rapid failure by erosion, or require the use of a molten regeneration cycle (type 1 regeneration) to counter erosion non-uniformities.

The heating mechanism(s), cooling mechanism(s) or their combination(s) may be changeable either in a continuous manner or in a discrete manner such that the target temperature can be changed over either a continuous range, or can occupy at least two different temperature states, such that the lowest temperature is less than or equal to the temperature required to maintain the target in a solid state and the highest temperature is equal to or greater than the temperature required to achieve one or more of the following without permanently preventing operation of the neutron generator: melting of the target material, degassing of the target material, diffusion of metallic or non-metallic contaminants into or through the target material, decomposition of compounds in the target formed by interaction with the particle beam, diffusion of the particle beam constituents, reaction products and/or decay products in the target material, promotion of adhesion of the target material to the target substrate, redistribution of target material thickness on the target substrate, or relief of stress in the target material.

The particle beam comprises the set of elements, molecules, compounds or their various ionized forms (neutral, positive or negative) that are capable of undergoing fusion, other neutron-producing reactions, or other useful nuclear reaction products, such as gamma rays and protons, with the target material or with material contained on or within the target, or both. Target material comprises the set of elements, alloys, compounds, composites and/or mixtures that can undergo fusion, other neutron-producing reactions, or other reactions that produce useful nuclear reaction products, with the particle beam, and/or can contain elements or compounds that can undergo these reactions with the particle beam.

Heating mechanisms include any method or combination of methods of heating that can be used to heat the target material while the target is in the vacuum environment present in a neutron generator, or other device for producing nuclear products, that does not require breaching the vacuum envelope and can achieve target temperatures greater than or equal to the lowest temperature required to achieve one or more of the following: melting of the target material, degassing of the target material, diffusion of metallic or non-metallic contaminants into or through the target material, decomposition compounds in the target formed by interaction with the particle beam, diffusion of the particle beam constituents, reaction products and/or decay products in the target material, promotion of adhesion of the target material to the target substrate, redistribution of target material thickness on the target substrate, or relief of stress in the target material.

Cooling mechanisms include any method of cooling or combination of methods of cooling that can be used to cool the target material while the target is in the vacuum environment present in a neutron generator, or other device for producing nuclear products, that does not require breaching the vacuum envelope and can achieve target temperatures less than or equal to the temperature required to solidify the target material.

The heating of the target for aspects of the invention can be accomplished by several methods, including: induction heating of the target material or target substrate, beam-impingement (ion, electron or fast neutral) on the target material or target substrate, resistive heating of the target material or target substrate, convective heating via a working fluid in the target substrate, radiative heating of the target material or the target substrate, or conduction from an external heat source through the target substrate, chemical heating, electrical discharge, and coolant reduction. Cooling for aspects of the invention can be accomplished by several means, including, but not limited to radiative cooling, conductive cooling, convective cooling, thermoelectric/peltier cooling and others.

Note that some of gases trapped and may be released during in situ regeneration may include, but are not limited to, isotopes of atomic and molecular hydrogen and helium. Further, the surface contaminants may include, but are not limited to, oxides, nitrides, carbides, hydrocarbons, silicon, sputtered electrode and vacuum enclosure material, and degassed impurities from within the nuclear reaction producing device.

In summary, regeneration consists of continuously controlling or changing at discrete intervals the temperature of a target material, by changing the rate of energy input from a heating mechanism, changing the rate of energy removal from a cooling mechanism, or a combination of these, to allow one or more of the following: melting of the target material, degassing of the target material, diffusion of metallic or non-metallic contaminants into or through the target material, decomposition of compounds in the target formed by interaction with the particle beam, diffusion of the particle beam constituents, reaction products and/or decay products in the target material, promotion of adhesion of the target material to the target substrate, redistribution of target material thickness on the target substrate, or relief of stresses in the target material.

High Efficiency Test

Further aspects of the invention relate to one or more of the following embodiments that include high neutron generating efficiency target. In one embodiment, the target shape and area is chosen in conjunction with the ion source to maintain the ion beam current density sufficiently below the threshold for ion beam pileup, where the ion interaction rate causes lattice disruptions and ionization events at a time scale greater than the local relaxation rate. By maintaining the beam current density below the natural lattice repair and recombination threshold, the formation of molecular hydrogen within the lattice may be suppressed with greater hydrogen isotope retention.

Figure 12:
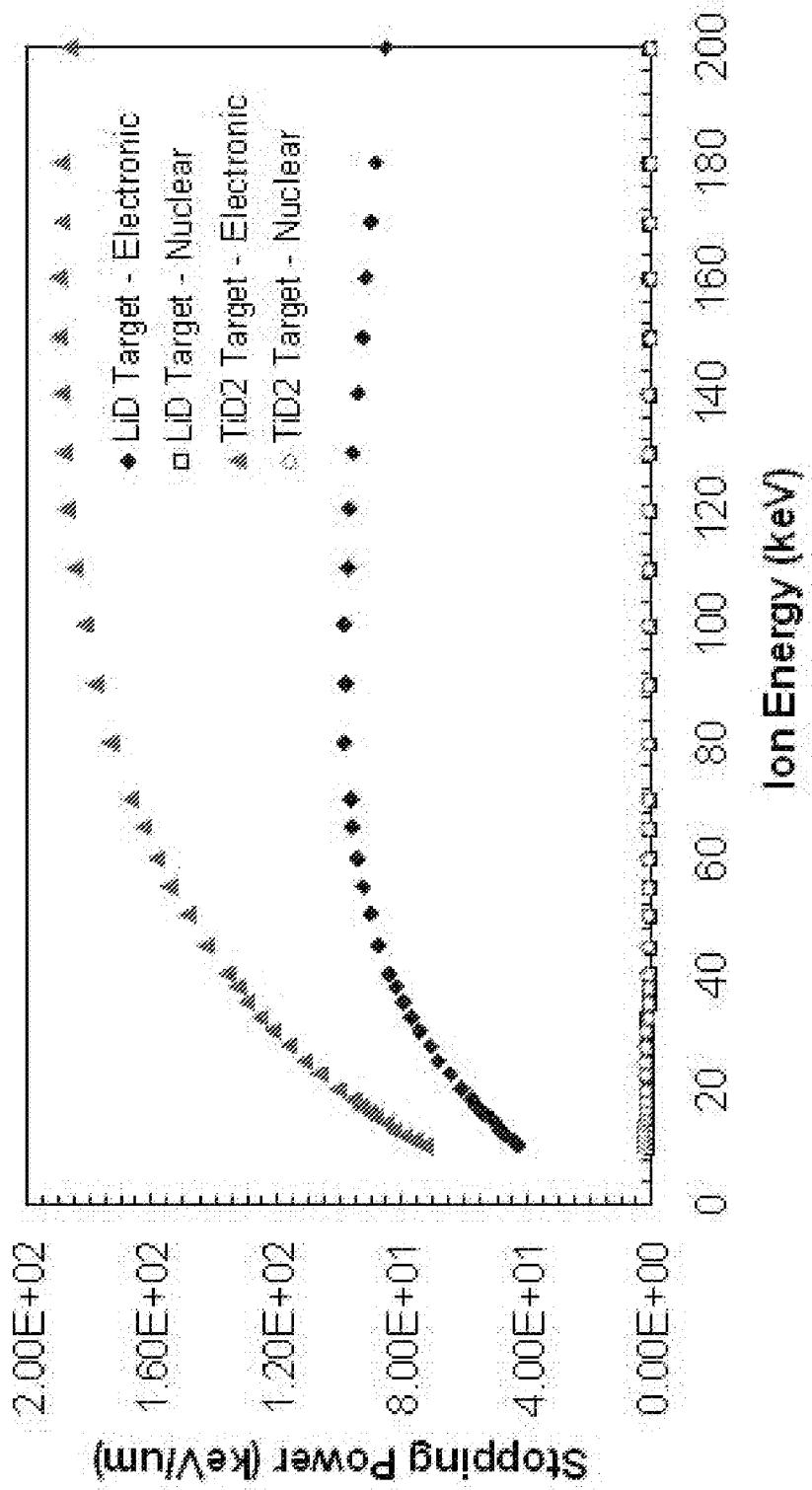
FIG. 12 is a chart showing a comparison of stopping of energetic deuterons, in keeping with disclosed principles.
Figure 13:
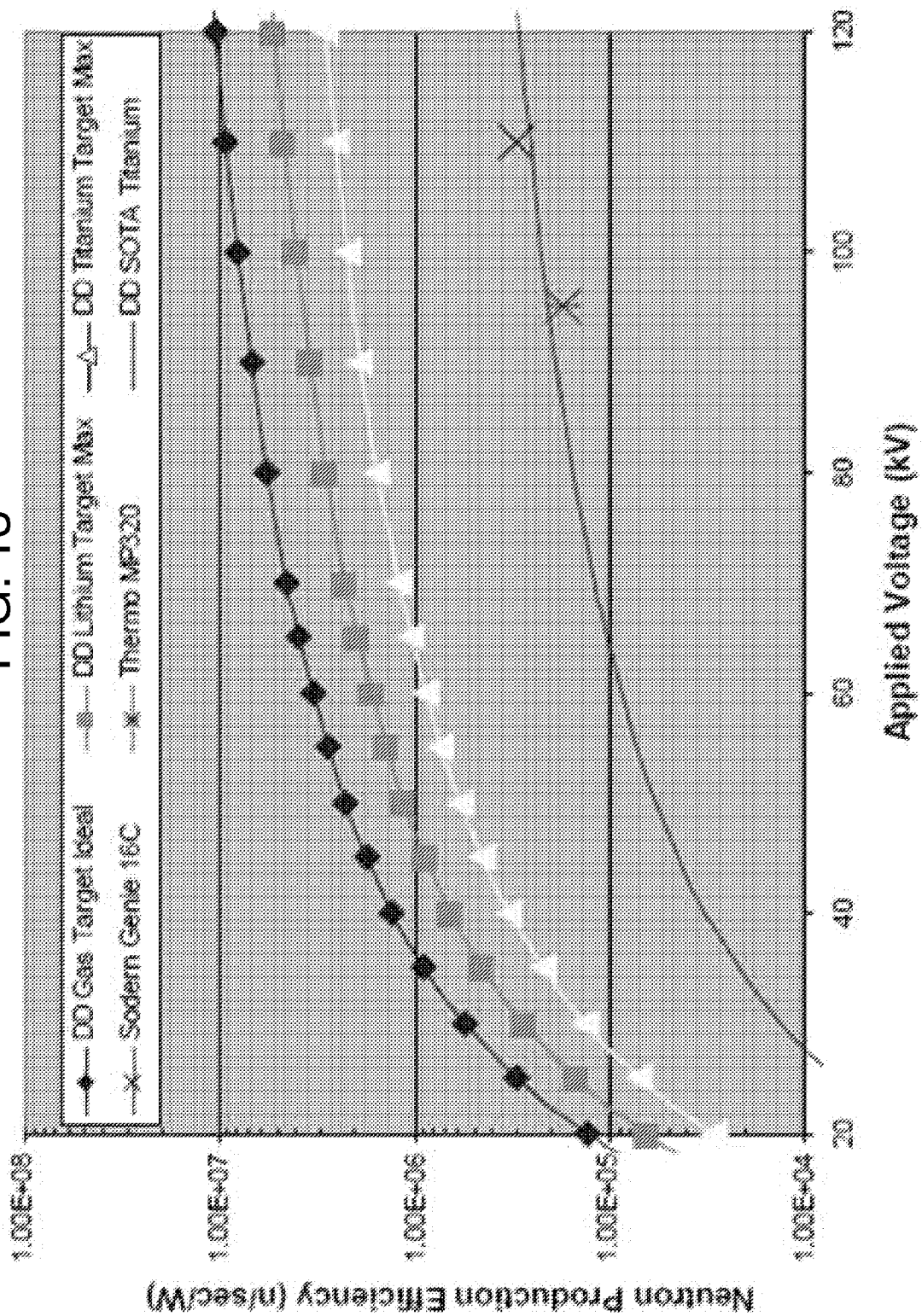
FIG. 13 is a chart showing a neutron production efficiency comparison, in keeping with disclosed principles.

FIG. 12 is a chart showing a comparison of stopping of energetic deuterons and FIG. 13 is a chart showing a neutron production efficiency comparison in keeping with disclosed principles discussed herein.

Figure 14:
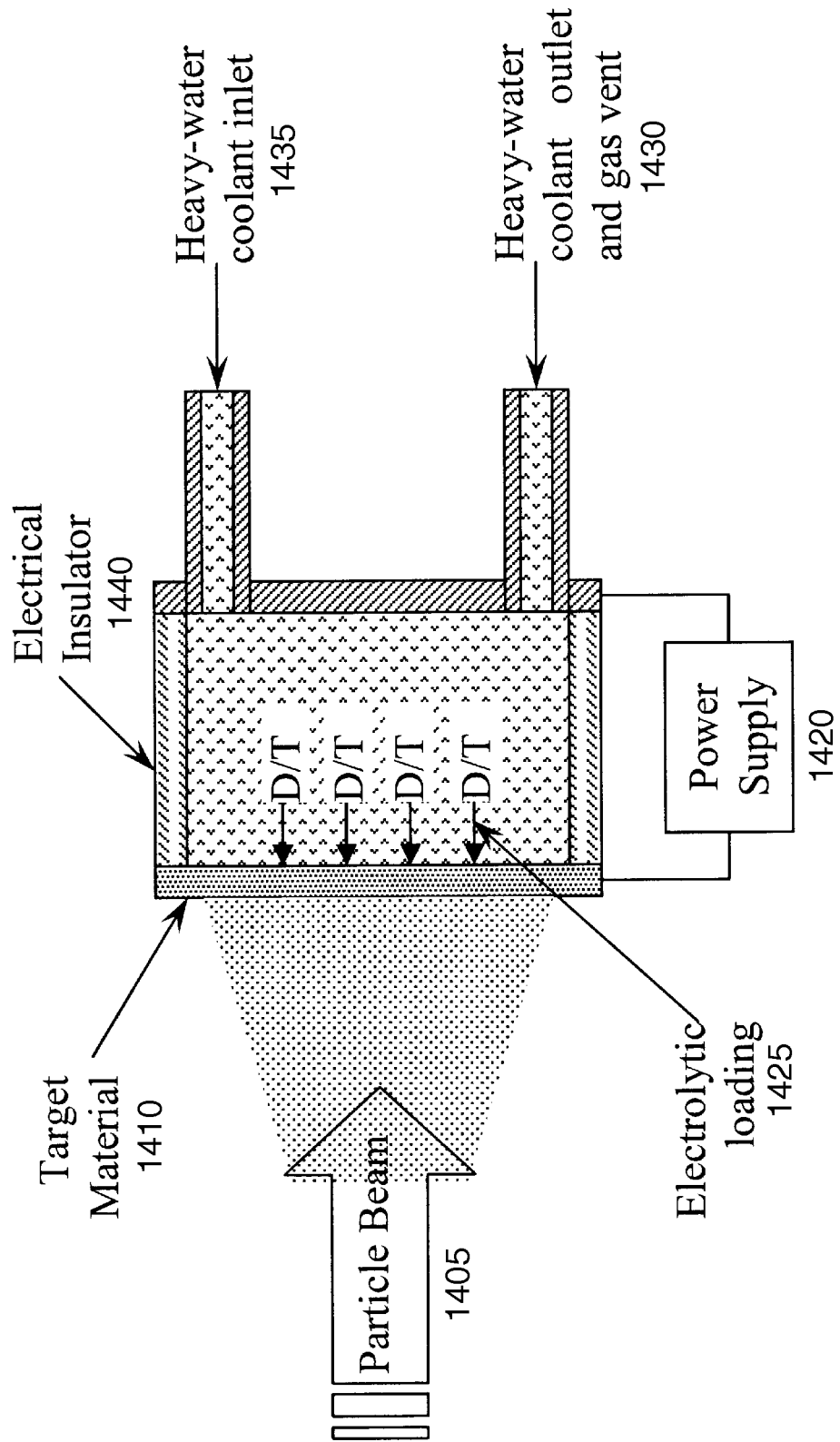
FIG. 14 shows an exemplary method for electrolytical target loading, according to an aspect of the invention.

In another embodiment shown in FIG. 14, the target material is electrolytically loaded 1425 with hydrogen isotopes from a fluid reservoir, such as a coolant channel with heavy water (1430, 1435), to electronically force very large concentrations of D or T into the target material 1410. As the ion beam 1405 impinges on the target surface and disrupts the lattice, releasing trapped hydrogen, replacement hydrogen isotopes can be added back into the target to maintain a high loading concentration. A power supply 1420 and electrical insulator 1440 may be included in the embodiment.

Figure 15:
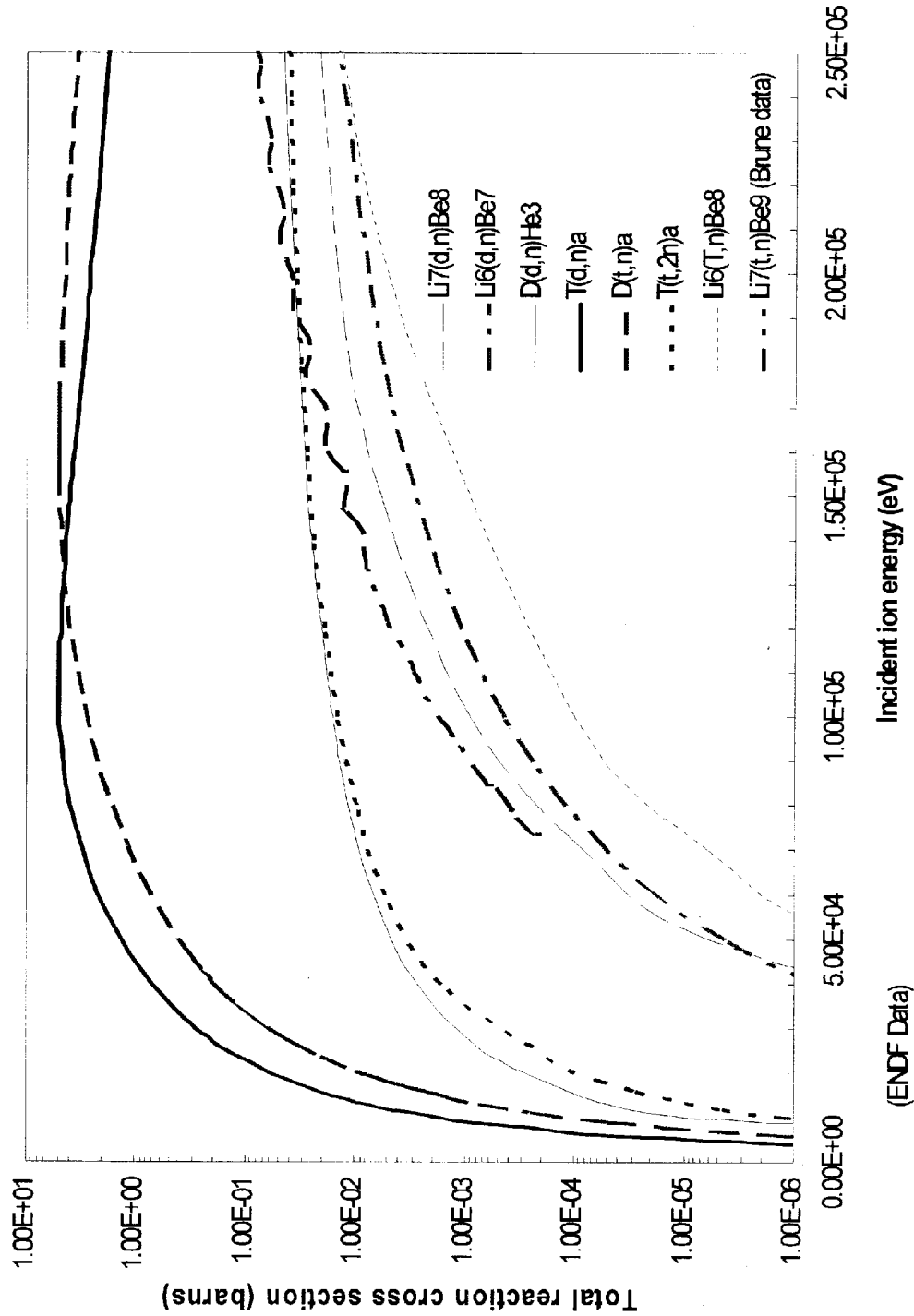
FIG. 15 is a chart showing comparisons of total cross sections for neutron generator applications with incident D or T ions, in keeping with disclosed principles.

In a preferred embodiment, the target material is substantially comprised of lithium, or a compound or solution containing lithium, to attain a very low atomic number to minimize the effective stopping power of the target. A pure lithium deuteride target with a 1:1 concentration has an effective stopping power of Z=2 compared with Z=11.5 for a 1:1 concentration titanium deuteride target, thus, incident ions maintain high energy over a longer range (approximately 5 times) for increased reaction rate probability. As a result, very high neutron production efficiencies can be obtained approaching that of a pure gas-target. Moreover, neutron output efficiency is increased by secondary D and T interactions with $^6$Li and $^7$Li within the target material. Incident hydrogen ions have non-negligible interaction cross sections (see FIG. 15) for neutron-producing reactions with lithium:

$$D+^6Li=^7Be+n \text{ (Q=3.38 MeV, En=2.96 MeV)}$$

$$D+^7Li=^8Be+n \text{ (Q=15.0 MeV, En=13.3 MeV)}$$

$$T+^6Li=^8Be+n \text{ (Q=16.0 MeV, En=14.2 MeV)}$$

$$T+^7Li=^9Be+n \text{ (Q=10.4 MeV, En=9.39 MeV)}$$

Figure 16:
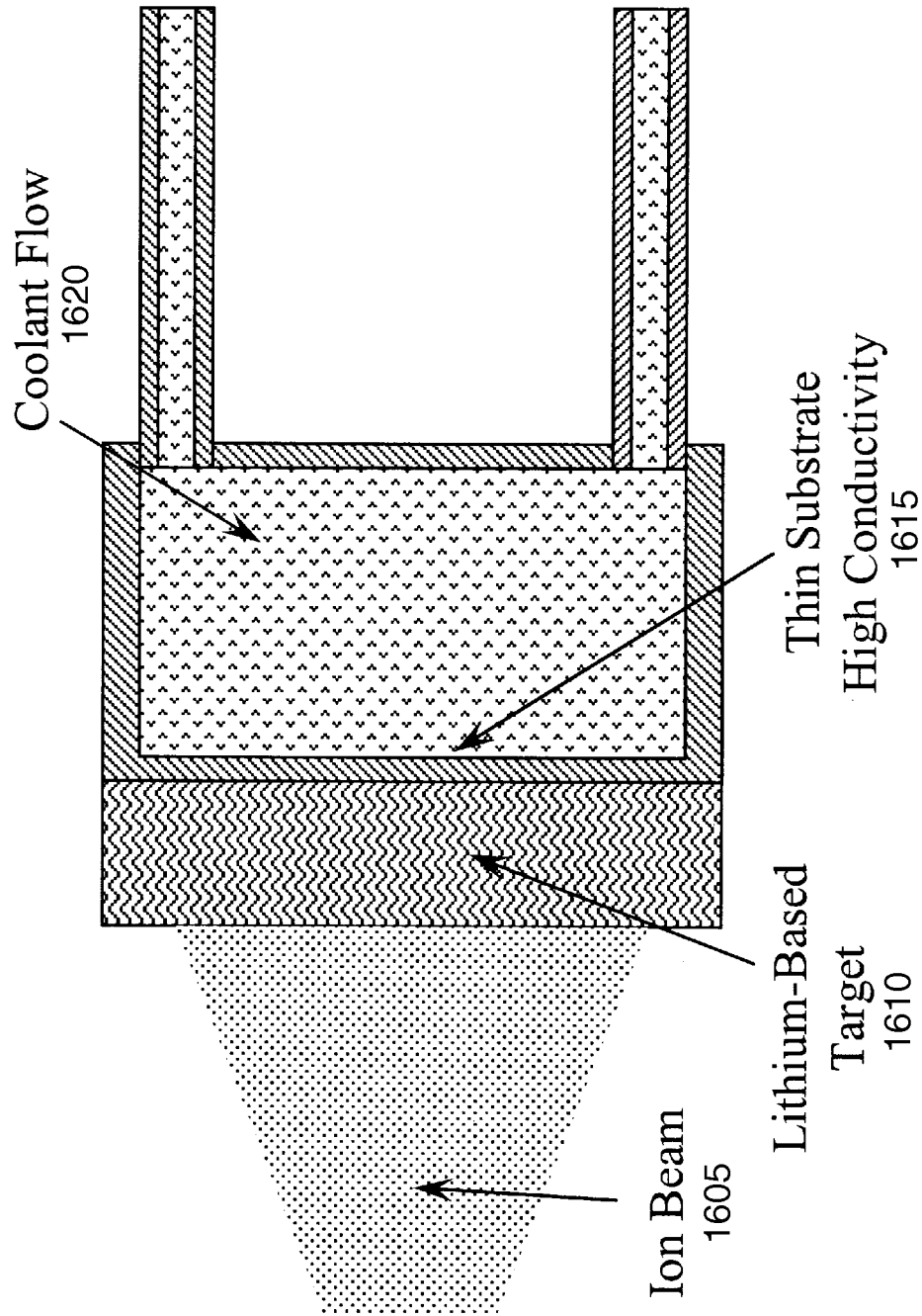
FIG. 16 shows an exemplary system and method for generating neutrons from a lithium based target, according to an aspect of the invention.

The moderately high lithium-hydrogen bond energy (~2.5 eV) also acts as a driver to trap hydrogen with the target material in the hydride phase, or to serve as a potential for lattice trapping with jump thresholds of greater than 0.5 eV. Lithium has a very high value of thermal conductivity compared to stainless steel, titanium, and other target materials. This allows greater target cooling capability to limit hydrogen diffusion throughout the target material and keep high loading fractions. The addition of other materials, such as boron, aluminum, or carbon, can also affect the hydrogen retention and alter the diffusion characteristics, depending on the target operating temperature. Optimization between effective Z and loading fraction can be done with average target temperature and ion beam current density (target shape). In FIG. 16, a preferred embodiment is shown with an ion beam 1605 impinging on a Lithium based target 1610. The target 1610 is set on a thin substrate with high conductivity 1615. Coolant flows 1620 behind the substrate 1615.

Further, lithium has special properties to more readily allow in-situ target regeneration and deposition techniques to alleviate contamination effects, replenish eroded target material and to anneal/restore target performance over extended lifetimes. For example, lithium can be easily evaporated onto a substrate with good surface wetting and adhesion for excellent thermal contact. This allows larger thickness targets to be utilized for lifetime considerations, while maintaining large hydrogen inventories. Porous foam (e.g., Mb) substrates can serve as a reservoir and in-situ deposition application through capillary action. Contamination issues are present with lithium, especially with target preparation and transfer between vacuum systems. Capping layers can be used to protect exposed surfaces to water, air and other contaminants, however, these layers would need to be removed by one of several possible processes including, but not limited to, melting to drive the layer into the bulk or sputter removal of the layer by the ion beam at full or reduced energy.

In still another embodiment, the target material is a lithium compound with low molecular weight, including LiBD4, LiND$_2$, LiAlD$_4$, and LiCD$_3$. In still a further embodiment, the target utilizes the reactions of deuterium and tritium with lithium, beryllium, boron and carbon for neutron-producing reactions to boost the neutron production rate at little or no energy cost, thus increasing the efficiency. In still another embodiment, the target material may have the following properties: the average or effective atomic number of the target material is between 1 and 21; the target material can be regenerated in situ; the target material can be deposited in situ; the target material has the capability of causing secondary neutron-producing reactions with cross sections greater than 1 microbarn.

Selectable Neutron Energy Spectrum

Figure 17:
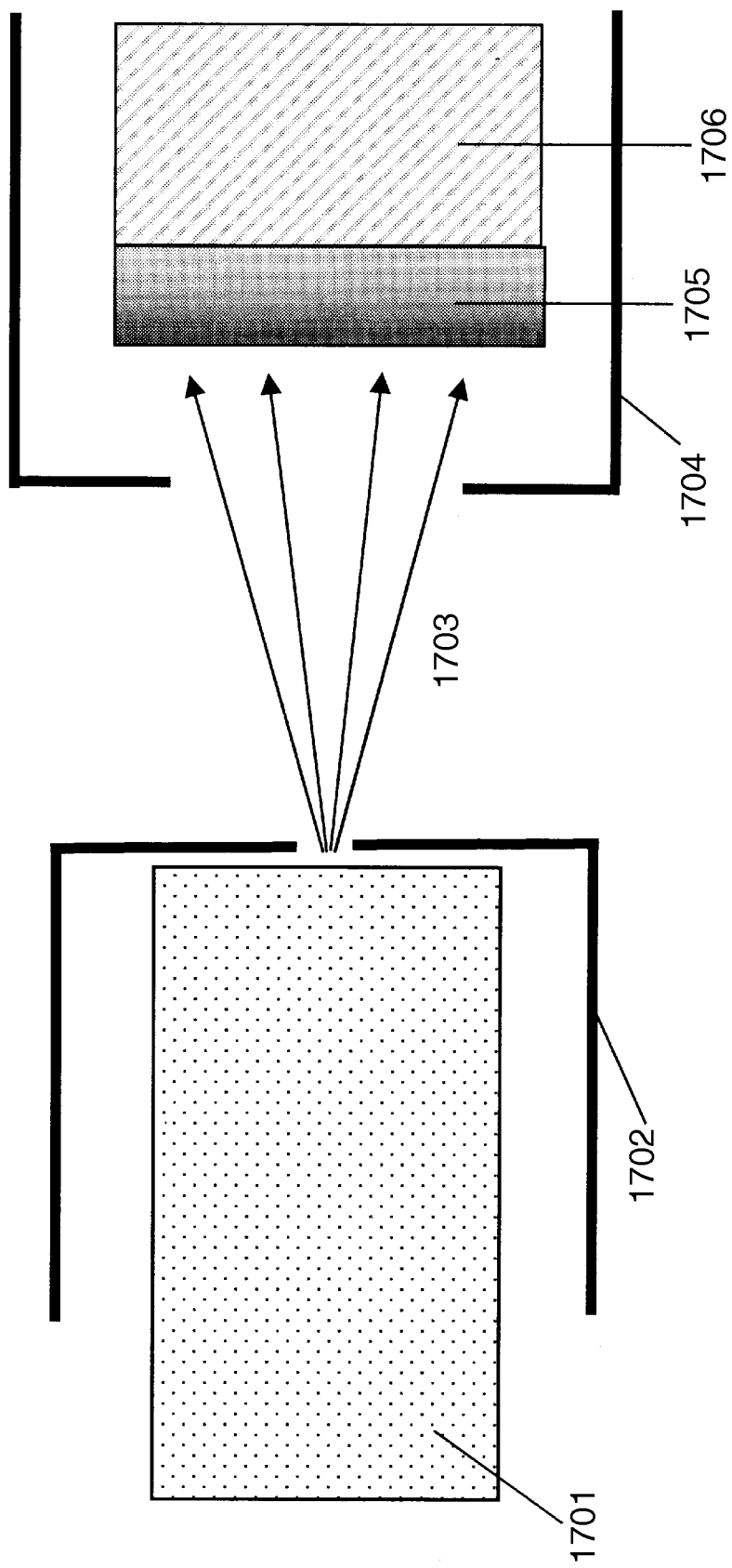
FIG. 17 shows a basic, cylindrically-symmetric compact accelerator neutron generator, according to an aspect of the invention.

FIG. 17 is a simplified diagram of a neutron generator using compact accelerator technology. The ion source 1701 generates ions by one of a number of methods. These ions are accelerated by the potential difference between anode electrode 1702 and the target or cathode 1705 to the desired ion energy. This produces an ion beam 1703 that bombards the target inducing nuclear reactions in the target materials. The target typically includes materials that simply retain the implanted hydrogen in addition to the implanted target species. Suppressor electrode 1704 minimizes ion induced electrons from the target from reaching the anode as it remains at a small negative bias compared to the target itself. The target substrate 1706 provides structural and vacuum integrity to the target and allows for active or passive cooling of the target material. All of the shown parts are typically housed in a glass tube hermetically sealed on each end and operated with some pressure of hydrogen fill gas that is regulated by internal components.

Figure 18:
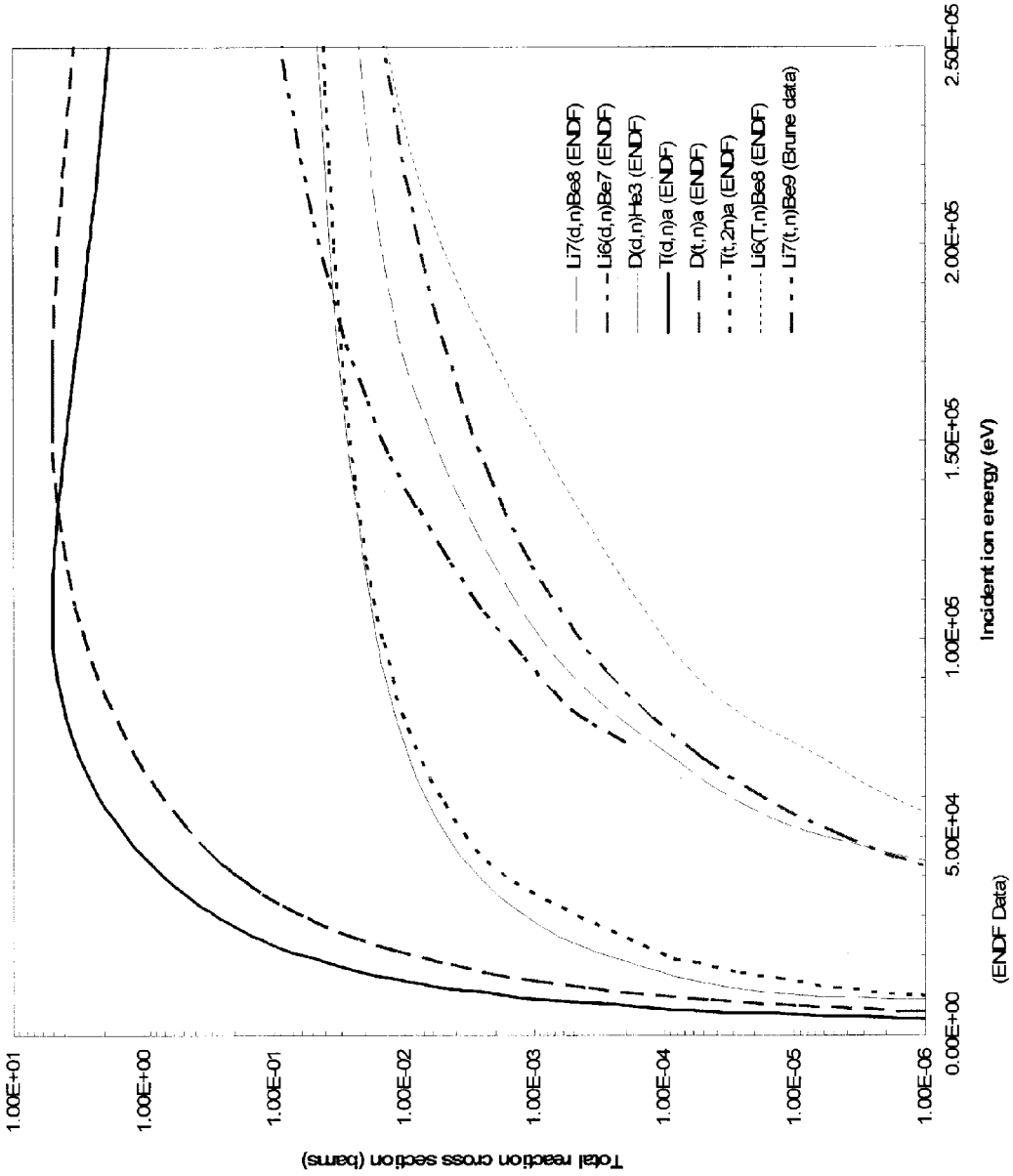
FIG. 18 shows a chart for comparisons of the nuclear reaction cross sections for the cases of D or T bombardment, in keeping with disclosed principles.

Typically, neutron generators use either a metal-hydride (more specifically, deuterides or tritides) or simply a material implanted with heavy hydrogen as targets that is bonded to the cooled substrate material. Here the target material (outside of the hydrogen) is simply used to contain as much of the hydrogen fuel as possible (maximize target fuel species density) and to facilitate heat transfer away from the reaction surface to minimize thermal damage. Aspects of the invention suggest the use of materials that contain nuclides that undergo neutron-emitting nuclear reactions themselves, while under heavy hydrogen bombardment in addition to the traditional roles that the target materials play. The target nuclides can be specifically chosen such that the resulting neutrons emitted have the desired energies. While their cross sections are not as favorable, a few key benefits are quickly realized. (See FIG. 18) Efficiency improvement if the hydrogen isotope remains on the surface since the target materials that act to retain D and T and aid in heat transfer can also undergo neutron-producing fusion without additional energy costs. A given system can have different neutron energy output depending on operating parameters. For example, the target temperature can be raised to drive hydrogen out of the target to have most interactions occurring with the target material (e.g., letting D-$^7$Li reactions dominate) or the target can be cooled to have reactions with both hydrogen and target nuclei. Similarly, other material parameters can be modified in situ to change which nuclei are involved in the reactions once one or more nuclides are in the condensed phase and can be moved out of the way of the beam (unlike the D and T which eventually tend to desorb and return to the ion source region to become incident ions).

Aspects of the invention use the following parameters to customize the resultant neutron energy spectra: ion energy during operation, target isotopic composition during manufacturing, and the ability of the operator to manipulate different target species independently when different elements are used that are condensable and do not play a role in the bombarding species (which would nominally remain D and/or T).

Figure 21:
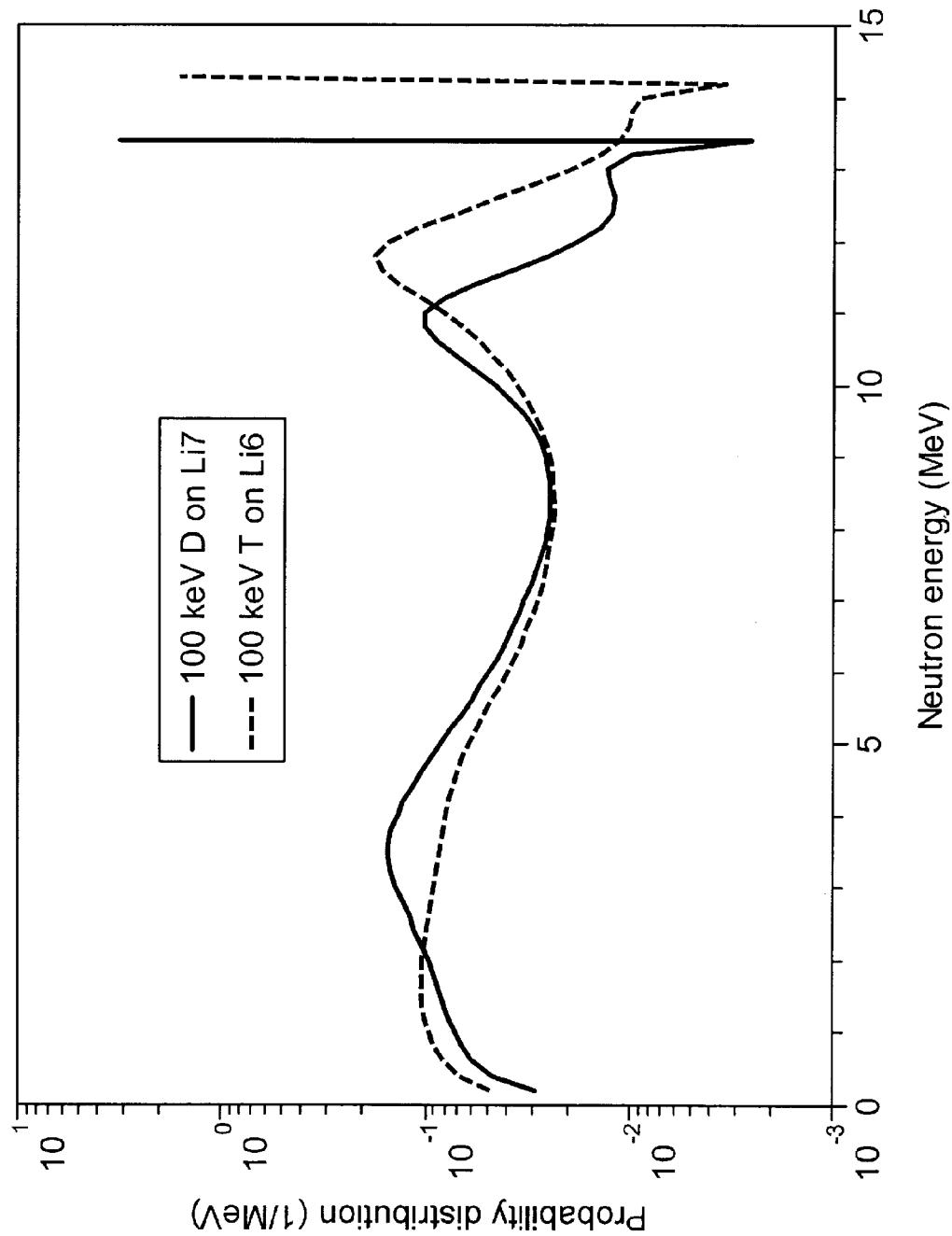
FIG. 21 is a chart showing a comparison of neutron energy distributions, in keeping with disclosed principles.

One method to achieve the goal of a distribution in neutron energy spectrum is to use an alternative target material that can undergo neutron-producing reactions in addition to the standard D and T reactions. One candidate material is lithium that has reaction cross sections for fusion reactions that are comparable to that of the DD reaction (see FIG. 18) in the ion energy range of interest. The reactions $$D + {}^6Li = {}^7Be + n \ (Q = 3.38 \text{ MeV}, E_n = 2.96 \text{ MeV}),$$

$$D + {}^7Li = {}^8Be + n \ (Q = 15.0 \text{ MeV}, E_n = 13.3 \text{ MeV}),$$

$$T + {}^6Li = {}^8Be + n \ (Q = 16.0 \text{ MeV}, E_n = 14.2 \text{ MeV}), \text{ and}$$

$$T + {}^7Li = {}^9Be + n \ (Q = 10.4 \text{ MeV}, E_n = 9.39 \text{ MeV})$$

are all neutron-producing with appropriate Q-values and maximum neutron energies indicated in parentheses. Note that all of the above residual nuclei may themselves decay in one manner or another (some neutronic, some aneutronic) depending on the nuclide itself and the level of excitation, if any. This results in interesting energy spectra of the generated neutrons as shown in FIG. 21. More importantly for applications that require a high neutron energy component is the fact that all of them but the D-$^6$Li reaction produces at least some neutrons well above the 2.45 MeV neutrons produced in the DD reaction.

While certainly not the only candidate material, as Be, B, and C-containing targets could also be used for the same purpose, lithium does have other inherent advantages over more conventional target materials. Lithium is an excellent target material candidate since its atomic number is low and has a similarly low electronic stopping power. This means that there is a greater probability for nuclear interaction as the deuteron ion implants into the target material, since the ion will have a greater range and interact with more target nuclei before stopping. Further, we stress that lithium (or other reactable target materials) need not be the only species, as other combinations such as Li—Al alloys (which form stable hydrides) or Li—B compounds could show additional benefits as well regarding the retention of hydrogen or longevity.

Use of temperature or other means to increase or decrease the level of D or T in the target in situ is one way to adjust the neutron energy spectrum as necessary by increasing or decreasing, respectively, reactions between the bombarding species and D or T. An example case would be where one would intentionally allow the target to get very hot to desorb all implanted hydrogen such that reactions with the solid or liquid host species is preferred. Alternatively, one can vary the non-hydrogen reaction species by physically moving it out of the way of the beam to allow only reactions with the ion species themselves. An example would be if two physical targets were present in the system and either the beam was moved between the two, or the targets themselves moved such that with one, fast neutrons via D-$^7$Li reactions were produced to help identify elements needing fast neutrons, but the other target (with e.g., only $^6$Li) would only produce neutrons with energies below 3 MeV to prevent a strong signal from those same elements that require fast neutrons to detect. A prime example is detection of oxygen ($^{16}$O) through inelastic neutron scattering. The cross section for this is vanishingly small (<μb) below 6.5 MeV (neutron energy) and very strong a bit above 6.5 MeV (hundreds of mb); thus, while difficult to isolate without fast neutrons, the presence of fast neutrons can yield a gamma signal strong enough to cover up other useful signals if the oxygen concentration is substantial (some systems, in fact, specifically avoid the fast neutrons for this reason).

Figure 19:
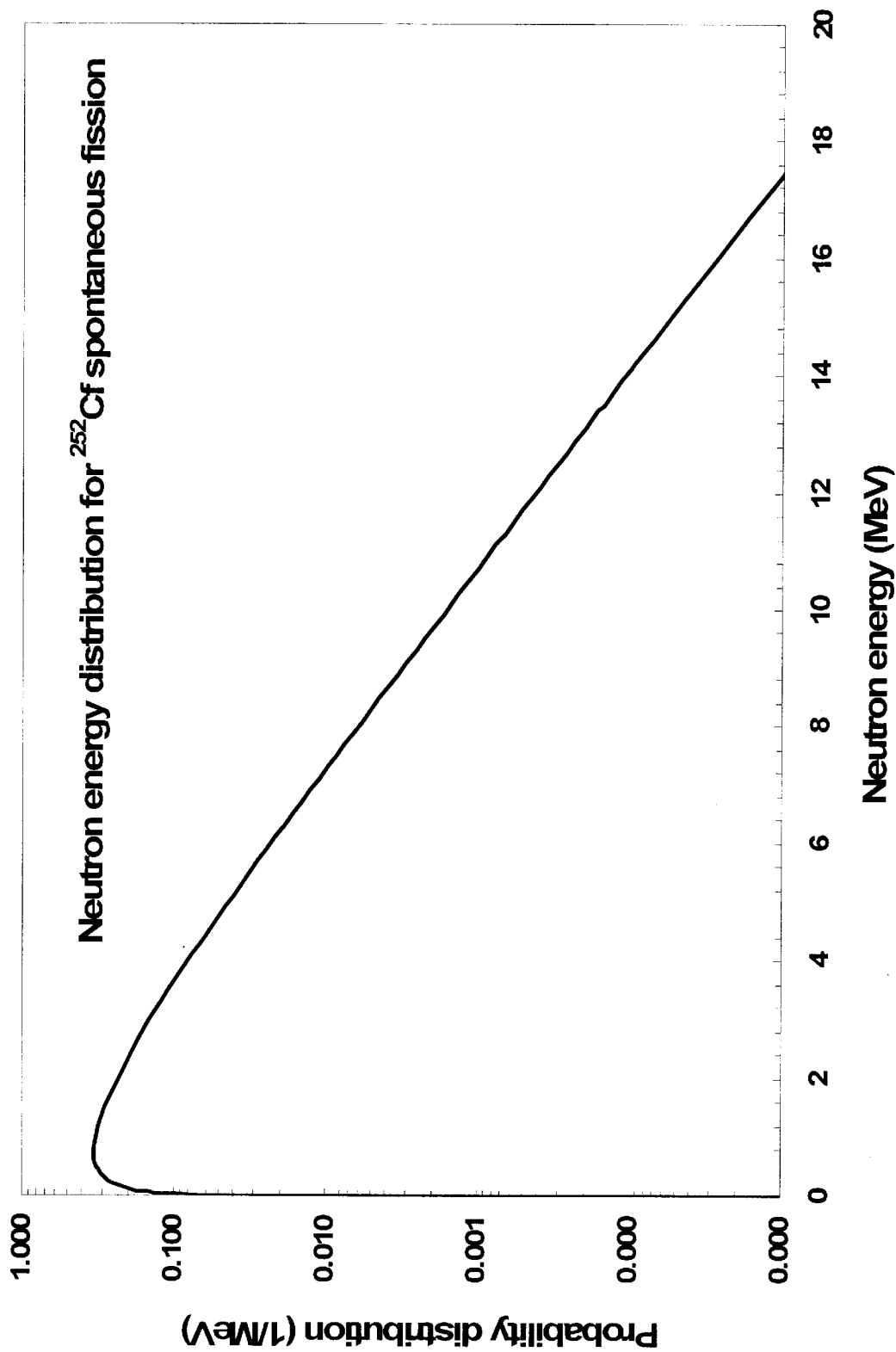
FIG. 19 is a chart showing the neutron energy spectrum from $^{252}$Cf sources, in keeping with disclosed principles.

Some analyzer systems of interest primarily rely on thermal neutrons for activation analysis. However, a small amount of fast neutrons are crucial for identifying particular nuclides and the small end of the high energy tail of the $^{252}$Cf sources provide just enough to do just that (See FIG. 19). A DD source produces monoenergetic neutrons at 2.45 MeV and therefore that is the highest neutron energy available, well short of the 6-8 MeV required to correctly identify some elements. While an electric DT-source with its 14 MeV neutrons and greatly favorable operating efficiency seems to be an obvious solution, the use of $^3$H is of regulatory concern and thermalizing neutrons of that high energy requires a lot of moderator and also requires a dramatic increase in shielding for personnel both driving the cost up and increasing the footprint in the field.

While the incident ion energy is primarily determined by the applied acceleration voltage, the ratio of atomic to molecular hydrogen ions also plays a role as the quantity of interest regarding the nuclear reaction is the energy per nucleus. Thus, a 1 mA beam of $D_2^+$ at 100 keV is equivalent to a 2 mA beam of 50 keV D+ ions. In this aspect of the invention, however, the term ion energy manipulation refers to changing either the accelerating voltage or changing the atomic to molecular fraction. Variability of the incident ion energy can also influence the neutron energy spectrum when using multiple target nuclides that have different reaction cross section shapes. Looking at FIG. 18, one can see that at 50 kV, the reaction cross section for D-D fusion is low, but reasonable, and that for the D-$^7$Li reaction is exceedingly small. Thus, by operating at 50 keV incident deuteron energy, one can minimize D-$^7$Li reactions while letting the D-D reactions proceed (although at a reduced rate). However, operating at 100 keV of incident energy, the fraction of D-$^7$Li reactions will be comparable to that of the D-D. Estimates for a thick target put the fraction (for equal targets with 1:1 D:Li ratio) of D-D to D-$^7$Li reactions at 50 keV and 100 keV at 700 and 40, respectively.

Variation of the isotopic content of the (condensed, neutron producing via D and/or T bombardment) target materials will also influence the final neutron energy distribution. During manufacturing, one can elect to have particular isotopes in either enriched or depleted quantities to favor or disfavor its reaction rate. One could even have multiple targets with different isotopic abundances that can either be moved into the beam or the beam diverted onto one at a time to allow in situ switching of the neutron energy spectrum.

Embodiment 1

No Fast Neutrons

Use of a lithium-containing target that is highly enriched in $^6$Li would still realize the advantages of the highly-efficient lithium target (low atomic number leads to reduced electronic stopping power, high thermal conductivity help keep it cooled when the target substrate is actively cooled, the reactions with the $^6$Li also produce neutrons in the 2-3 MeV range adding to the yield and neutrons generated per input energy). Furthermore, the low melting point of lithium makes it easy for the surface to be repaired after use by briefly melting the target surface to a partial or full extent. The isotopic enrichment of $^6$Li would further minimize the possibility of the 13 MeV neutrons otherwise produced via the D-$^7$Li reactions.

Embodiment 2

A Preferred Embodiment

A preferred embodiment of the proposed system is as a replacement of radionuclide sources in existing neutron analyzer designs, especially those that rely on a small fraction of the generated neutrons to have high energy (>8 MeV) neutrons for some elements, but not so many high energy neutrons to require the substantial shielding associated with a fast neutron (e.g., D-T) source.

Figure 20:
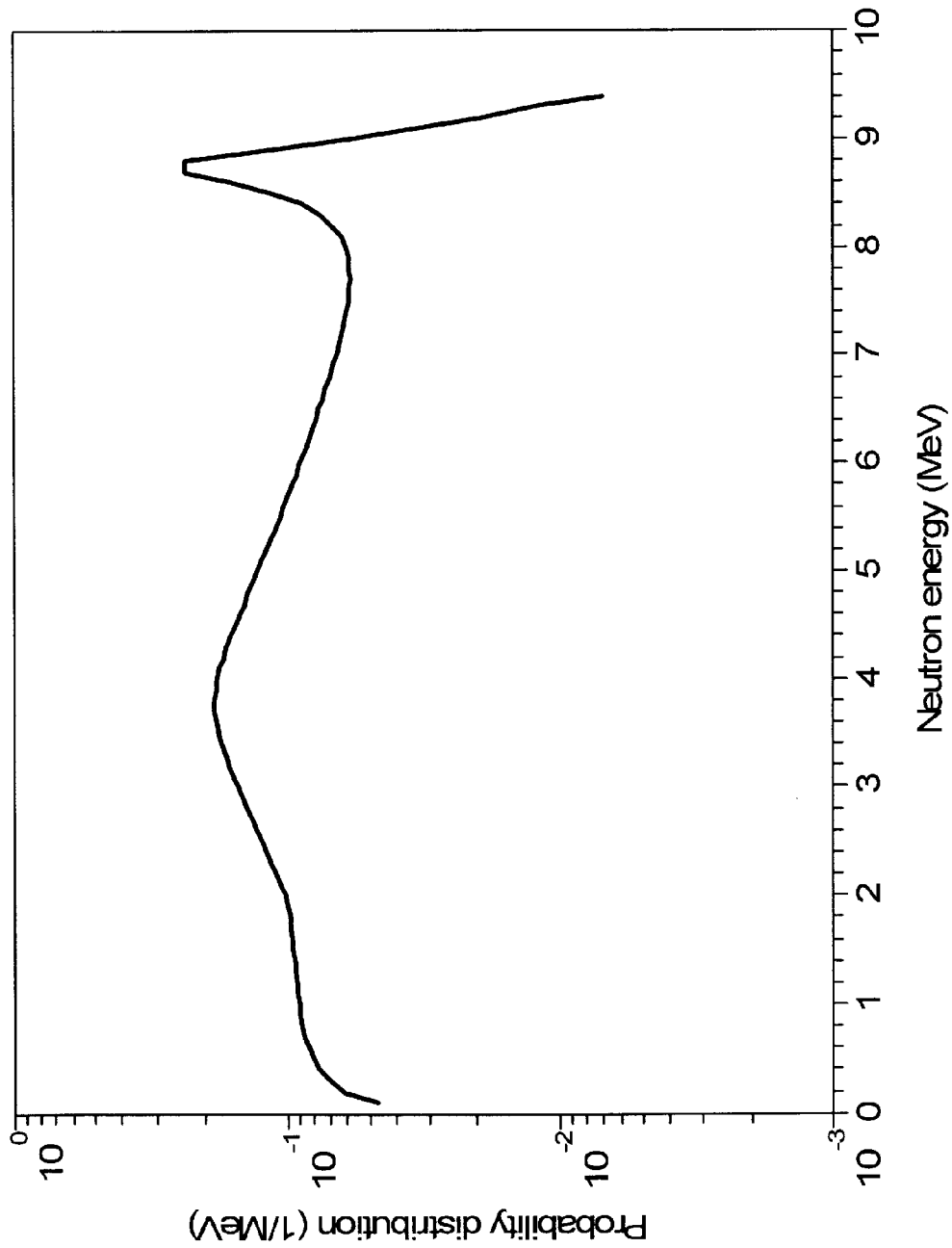
FIG. 20 is a chart showing the neutron energy distribution from T(t,2n) a reaction, in keeping with disclosed principles.

Certain industrial analysis applications require neutron energies exceeding 6-8 MeV for a portion of the spectrum. Typically tritium is required (for either D-T or T-T reactions) that leads to a radiological hazard and the consequent costs and restrictions (See FIG. 20). For these particular systems that require high neutron energies but must or would prefer to avoid the use of tritium for regulatory, export, safety, or cost reasons, bombarding lithium target enriched with $^7$Li (if necessary to go beyond the natural abundance of ~92.5% $^7$Li) with high energy deuterons for D-$^7$Li fusion that produces neutrons with energies up to 13 MeV. Operating at the energy levels of typical compact accelerator neutron generators (say, 10 to 500 keV), the fraction of neutrons emitted above 8 MeV via the D-$^7$Li reaction is maintained above 35% and only decreases slowly which is more than compensated for once the improvement in cross section with interaction energy is included.

A preferred embodiment of this aspect of the invention has a pure D ion source that bombards a lithium-containing target and generates neutrons via the D(d,n)$^3$He, $^6$Li(d,n)$^7$Be, and $^7$Li(d,n)$^8$Be reactions. The specific branching ratio of the reactions and the resulting neutron energy spectrum is controlled by the isotopic concentration of the lithium in the target during manufacturing and in the field by ion energy distribution and/or target surface manipulation (movement or heating/cooling).

Persons of ordinary skill in the art understand that the target particles such as D are held by target material such as Li. In addition, persons of ordinary skill in the art understand that neutrons are generated by fusion nuclear reactions between the ions (e.g., D$^+$) with that target particles (e.g., D) held by a target material. Further, persons of ordinary skill in the art understand that ions colliding with the target materials itself (e.g., Li) create fusion reactions that produce neutrons. Persons of ordinary skill in the art also recognize that target material may include the target material as well as a target particle. Moreover, persons of ordinary skill in the art would recognize that aspects of the invention discussed in one aspect of the invention (such as but not limited to, in situ deposition, in situ regeneration, selecting a high efficiency target, and selecting a neutron energy spectrum) may be applicable to other aspects and embodiments to the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for generating neutrons, the system comprising:
    a target positioned at a target location, the target including at least a target substrate suitable for supporting a target assembly layer;
    an anode electrode biased at a positive voltage relative to the target;
    an ion source configured to generate ions for acceleration by an electric potential difference between the anode electrode and the target; and
    a target maintenance system configured to perform one or more of the group consisting of:
        in situ deposition, onto the target substrate in order to form the target assembly layer and replenish the target assembly layer after it has been formed, of target material capable of being loaded with at least one of deuterium and tritium, wherein the target assembly layer is formed of the target material; and
        in situ regeneration of the target material forming the target assembly layer to repair or reform the target assembly layer.

2. The system according to claim 1, wherein the target maintenance system is configured to perform only in situ deposition of target material.

3. The system according to claim 1, wherein the target maintenance system comprises a source of target material for in situ deposition onto the target substrate.

4. The system according to claim 3, wherein the target maintenance system is configured to perform in situ deposition of target material onto the target substrate during one or more of the group consisting of: initial fabrication of the system, discrete intervals during operation of the system, maintenance cycle of the system, and continuous operation of the system.

5. The system according to claim 1, further comprising a source of target material that is one of the group consisting of: a coating on one or more surfaces of parts of the neutron generator, one or more surfaces of parts within the neutron generator, electrodes of the neutron generator, a reservoir, and an evaporator assembly.

6. The system according to claim 1, wherein in situ deposition, onto the target substrate in order to form or replenish the target assembly layer, of target material includes one or more of the group consisting of: evaporation, sublimation, chemical vapor deposition, physical vapor deposition, sputtering, beam deposition, and flowing of liquid target material.

7. The system according to claim 1, wherein the target assembly layer is between 2 microns and 3 microns in thickness.

8. The system according to claim 1, wherein the target maintenance system is further configured to maintain a thickness of the target assembly layer.

9. The system according to claim 1, wherein in-situ regeneration of the target material to repair or reform the target assembly layer comprises one or more of the group consisting of: induction, direct beam impingement, coolant reduction, resistive heating, convective heating, radiative heating, chemical heating, electrical discharge, radiative cooling, conductive cooling, convective cooling, thermoelectric cooling and conduction from an external thermal source through the target substrate.

10. The system according to claim 1, wherein the target maintenance system is configured to perform in-situ regeneration of the target material to repair or reform the target assembly layer is performed during one of the group consisting of: discrete intervals during operation of the system, a maintenance cycle of the system, and continuous operation of the system.

11. The system according to claim 1, further comprising a target degradation sensor configured to detect degradation of the target and to trigger one or more of the group consisting of: in-situ deposition and in-situ regeneration.

12. The system according to claim 1 wherein the target material forming the target assembly layer has properties that include one or more of the group consisting of: effective atomic number less than 21, stable hydride formation, thermal conductivity greater than 23 W/m/K, impurity solubility, hydrogen diffusion, hydrogen retention, and neutron-producing secondary reaction capability.

13. The system of claim 1, the system further comprising a suppression electrode biased to a negative voltage with respect to the target.

14. The system according to claim 1, wherein the target assembly layer comprises lithium.

15. The system according to claim 12, wherein neutron producing secondary reaction capability includes the capability to produce one of the group consisting of: D-6Li fusion reactions, D-7Li fusion reactions, T-6Li fusion reactions, or T-7Li fusion reactions.

16. The system according to claim 1, wherein the target is thermally connected to one or more of the group consisting of: a thermal management system and an external enclosure.

17. The system according to claim 1, further comprising a hydrogen isotope implanter, the hydrogen isotope implanter configured to perform in-situ implantation of hydrogen isotopes into the target assembly layer, the hydrogen isotopes provided by one or more of the group consisting of: a particle source, a secondary plasma source, and an electrolytically-driven source.

18. A method for maintaining a system for generating neutrons, the system including a target having at least a target substrate capable of supporting a target assembly layer, an ion source configured to generate ions for acceleration by an electric potential difference between an anode electrode and the target, and a target maintenance system, the method comprising:
    performing, by the target maintenance system, in situ deposition, onto the target substrate in order to form or replenish the target assembly layer, in situ deposition, onto the target substrate in order to form or replenish the target assembly layer, of target material capable of being loaded with one or more of deuterium and tritium, wherein the target assembly layer is formed of the target material; and
    performing, by the target maintenance system, in situ regeneration of the target material forming the target assembly layer to mitigate target assembly layer degradation and preserve neutron production efficiency over the lifetime of the system.

19. A method for generating neutrons having a selected energy spectrum, the neutrons being generated by a system including a target having at least a target assembly layer supported by a target substrate, an ion source configured to generate ions for acceleration by an electric potential difference between an anode electrode and the target, and a target maintenance system, the method comprising:
    establishing a ratio of 6Li to 7Li isotopes in a target assembly layer by performing, by the target maintenance system, in situ deposition of target material including one or more of 6Li and 7Li; and
    establishing a selected electric potential difference between the anode electrode and the cathode to adjust the incident particle energy to generate different sets of neutron energy spectra, wherein the neutron energy spectra is adjusted by the ratio of 6Li to 7Li isotopes in the target assembly layer; and
    directing the ions generated by the ion source and accelerated by the electric potential difference between the anode electrode and the target at the target assembly layer to cause secondary neutron producing reactions involving the ions and at least one of the 6Li and 7Li isotopes.

20. The method according to claim 19, wherein the method yields neutrons with energy greater than 3 MeV without the use of radioactive tritium and without acceleration potentials higher than 500 kV.

21. The system according to claim 1, wherein the target maintenance system is further configured to maintain a purity of target material forming the target assembly layer within a beam interaction layer.

* * * * *